(12) United States Patent
Kim et al.

(10) Patent No.: US 11,281,333 B2
(45) Date of Patent: Mar. 22, 2022

(54) TOUCH DISPLAY DEVICE FOR REDUCING GHOST TOUCH DATA

(71) Applicant: LG Display Co., Ltd., Seoul (KR)

(72) Inventors: CheolSe Kim, Seoul (KR); JuHan Kim, Paju-si (KR); SeungSeok Oh, Paju-si (KR); HoonBae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/123,467

(22) Filed: Dec. 16, 2020

(65) Prior Publication Data

US 2021/0200417 A1 Jul. 1, 2021

(30) Foreign Application Priority Data

Dec. 27, 2019 (KR) .................. 10-2019-0175889

(51) Int. Cl.
  *G06F 3/041* (2006.01)
(52) U.S. Cl.
  CPC ...... *G06F 3/04186* (2019.05); *G06F 3/04166* (2019.05)
(58) Field of Classification Search
  CPC .................. G06F 3/04186; G06F 3/04166
  See application file for complete search history.

(56) References Cited

U.S. PATENT DOCUMENTS

| | | | |
|---|---|---|---|
| 2016/0195981 A1* | 7/2016 | Shin | G06F 3/04166 345/174 |
| 2017/0185184 A1 | 6/2017 | Kim | |
| 2017/0255299 A1 | 9/2017 | Shimoshikiryoh | |
| 2019/0196619 A1* | 6/2019 | Baek | G06F 3/04164 |
| 2019/0310728 A1* | 10/2019 | Yoshida | G06F 3/044 |
| 2020/0033979 A1* | 1/2020 | Sauer | G06F 3/0418 |

FOREIGN PATENT DOCUMENTS

CN 107506081 A 12/2017

OTHER PUBLICATIONS

European Patent Office, Extended European Search Report and Opinion, EP Patent Application No. 20212420.2, dated May 18, 2021, seven pages.

* cited by examiner

*Primary Examiner* — Chun-Nan Lin
(74) *Attorney, Agent, or Firm* — Fenwick & West LLP

(57) ABSTRACT

In a touch display device with a touch sensor structure in which two or more touch electrodes located in two or more subareas are electrically connected to each other via one touch line, it is possible to decrease the number of touch channels. With a touch sensor structure in which two or more touch electrodes are connected to each touch line in a touch electrode connecting structure capable of removing ghost data, it is possible to improve touch sensitivity greatly.

22 Claims, 25 Drawing Sheets

FIG.6

| | Reference | Case 1 | Case 2 | Case 3 |
|---|---|---|---|---|
| NUMBER OF DIVIDED AREAS (k) | 1 | 2 | 3 | 4 |
| NUMBER OF CONNECTED TE (Nc) | 1 | 2 | 3 | 3 |
| CHANNEL REDUCTION EFFECT | 1 | 1/2 | 1/3 | 1/2 |
| SCHEMATIC AREA DIAGRAM | Full Area (TSA) | Au1, Ad1 | Au1, Am1, Ad1 | Au1, Au2, Ad1, Ad2 |

FIG. 10

Touch Allocation Map

| TER # | A-TER # | TE Column Pattern | | | | |
|---|---|---|---|---|---|---|
| | | 3 | 1 | 2 | 3 | 1 |
| 1 | 01 | 01 - 3 | 01 - 1 | 01 - 2 | 01 - 3 | 01 - 1 |
| 2 | 02 | 02 - 3 | 02 - 1 | 02 - 2 | 02 - 3 | 02 - 1 |
| 3 | 03 | 03 - 3 | 03 - 1 | 03 - 2 | 03 - 3 | 03 - 1 |
| 4 | 04 | 04 - 3 | 04 - 1 | 04 - 2 | 04 - 3 | 04 - 1 |
| 5 | 05 | 05 - 3 | 05 - 1 | 05 - 2 | 05 - 3 | 05 - 1 |
| 6 | 06 | 06 - 3 | 06 - 1 | 06 - 2 | 06 - 3 | 06 - 1 |
| 7 | 07 | 07 - 3 | 07 - 1 | 07 - 2 | 07 - 3 | 07 - 1 |
| 8 | 08 | 08 - 3 | 08 - 1 | 08 - 2 | 08 - 3 | 08 - 1 |
| 9 | 09 | 09 - 3 | 09 - 1 | 09 - 2 | 09 - 3 | 09 - 1 |
| 10 | 10 | 10 - 3 | 10 - 1 | 10 - 2 | 10 - 3 | 10 - 1 |
| 11 | 11 | 11 - 3 | 11 - 1 | 11 - 2 | 11 - 3 | 11 - 1 |
| 12 | 12 | 12 - 3 | 12 - 1 | 12 - 2 | 12 - 3 | 12 - 1 |
| 13 | 13 | 13 - 3 | 13 - 1 | 13 - 2 | 13 - 3 | 13 - 1 |
| 14 | 14 | 14 - 3 | 14 - 1 | 14 - 2 | 14 - 3 | 14 - 1 |
| 15 | 15 | 15 - 3 | 15 - 1 | 15 - 2 | 15 - 3 | 15 - 1 |
| 16 | 16 | 16 - 3 | 16 - 1 | 16 - 2 | 16 - 3 | 16 - 1 |
| 17 | 17 | 17 - 3 | 17 - 1 | 17 - 2 | 17 - 3 | 17 - 1 |
| 18 | 18 | 18 - 3 | 18 - 1 | 18 - 2 | 18 - 3 | 18 - 1 |
| 19 | 01 | 09 - 3 | 01 - 1 | 15 - 2 | 09 - 3 | 01 - 1 |
| 20 | 02 | 12 - 3 | 04 - 1 | 18 - 2 | 12 - 3 | 04 - 1 |
| 21 | 03 | 15 - 3 | 07 - 1 | 01 - 2 | 15 - 3 | 07 - 1 |
| 22 | 04 | 18 - 3 | 10 - 1 | 04 - 2 | 18 - 3 | 10 - 1 |
| 23 | 05 | 01 - 3 | 13 - 1 | 07 - 2 | 01 - 3 | 13 - 1 |
| 24 | 06 | 04 - 3 | 16 - 1 | 10 - 2 | 04 - 3 | 16 - 1 |
| 25 | 07 | 07 - 3 | 02 - 1 | 13 - 2 | 07 - 3 | 02 - 1 |
| 26 | 08 | 10 - 3 | 05 - 1 | 16 - 2 | 10 - 3 | 05 - 1 |
| 27 | 09 | 13 - 3 | 08 - 1 | 02 - 2 | 13 - 3 | 08 - 1 |
| 28 | 10 | 16 - 3 | 11 - 1 | 05 - 2 | 16 - 3 | 11 - 1 |
| 29 | 11 | 02 - 3 | 14 - 1 | 08 - 2 | 02 - 3 | 14 - 1 |
| 30 | 12 | 05 - 3 | 17 - 1 | 11 - 2 | 05 - 3 | 17 - 1 |
| 31 | 13 | 08 - 3 | 03 - 1 | 14 - 2 | 08 - 3 | 03 - 1 |
| 32 | 14 | 11 - 3 | 06 - 1 | 17 - 2 | 11 - 3 | 06 - 1 |
| 33 | 15 | 14 - 3 | 09 - 1 | 03 - 2 | 14 - 3 | 09 - 1 |
| 34 | 16 | 17 - 3 | 12 - 1 | 06 - 2 | 17 - 3 | 12 - 1 |
| 35 | 17 | 03 - 3 | 15 - 1 | 09 - 2 | 03 - 3 | 15 - 1 |
| 36 | 18 | 06 - 3 | 18 - 1 | 12 - 2 | 06 - 3 | 18 - 1 |

Y-AXIS SEPARATION DISTANCE

Increasing Value

Au1

Ad1

COLUMN PERIOD

FIG. 12  Touch Allocation Map

FIG.15
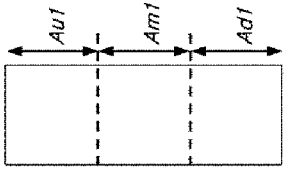
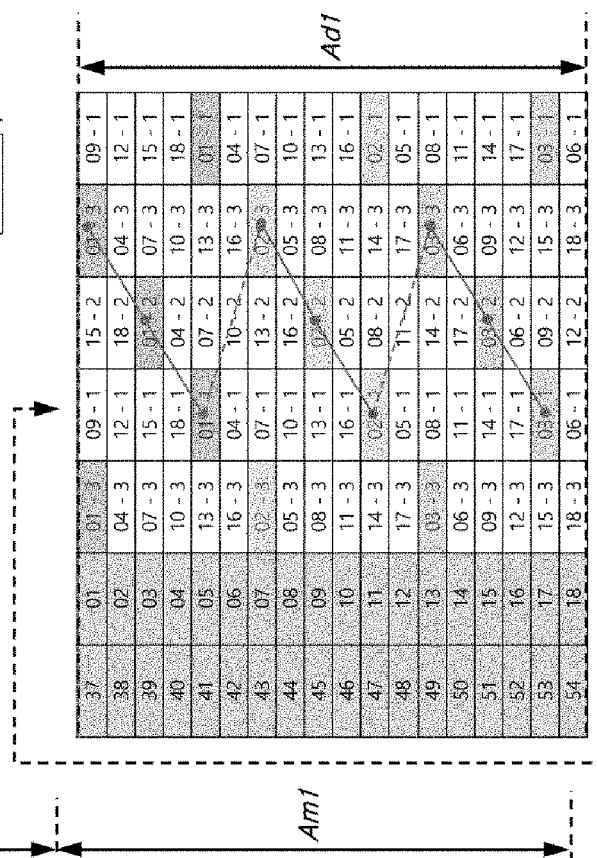

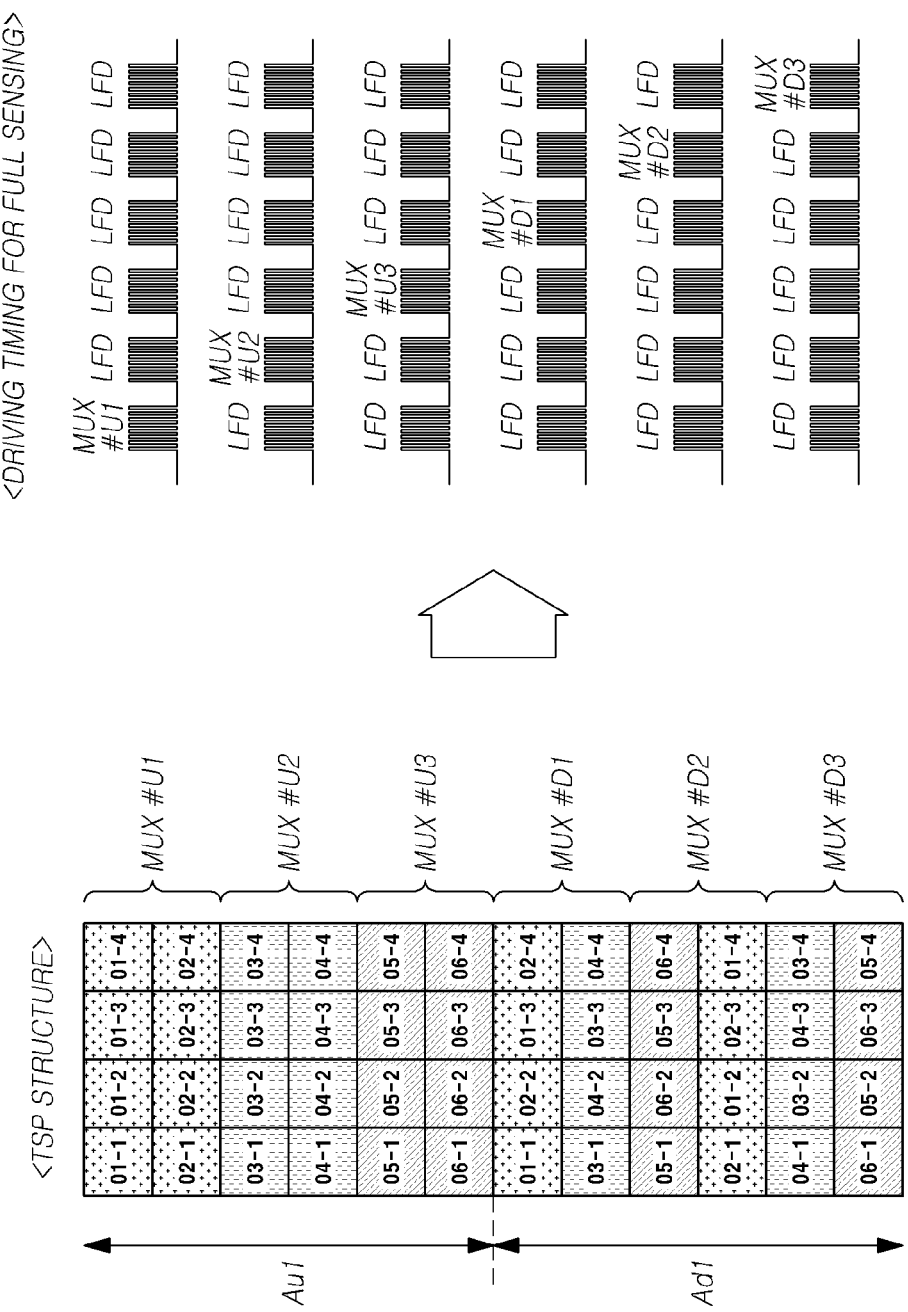

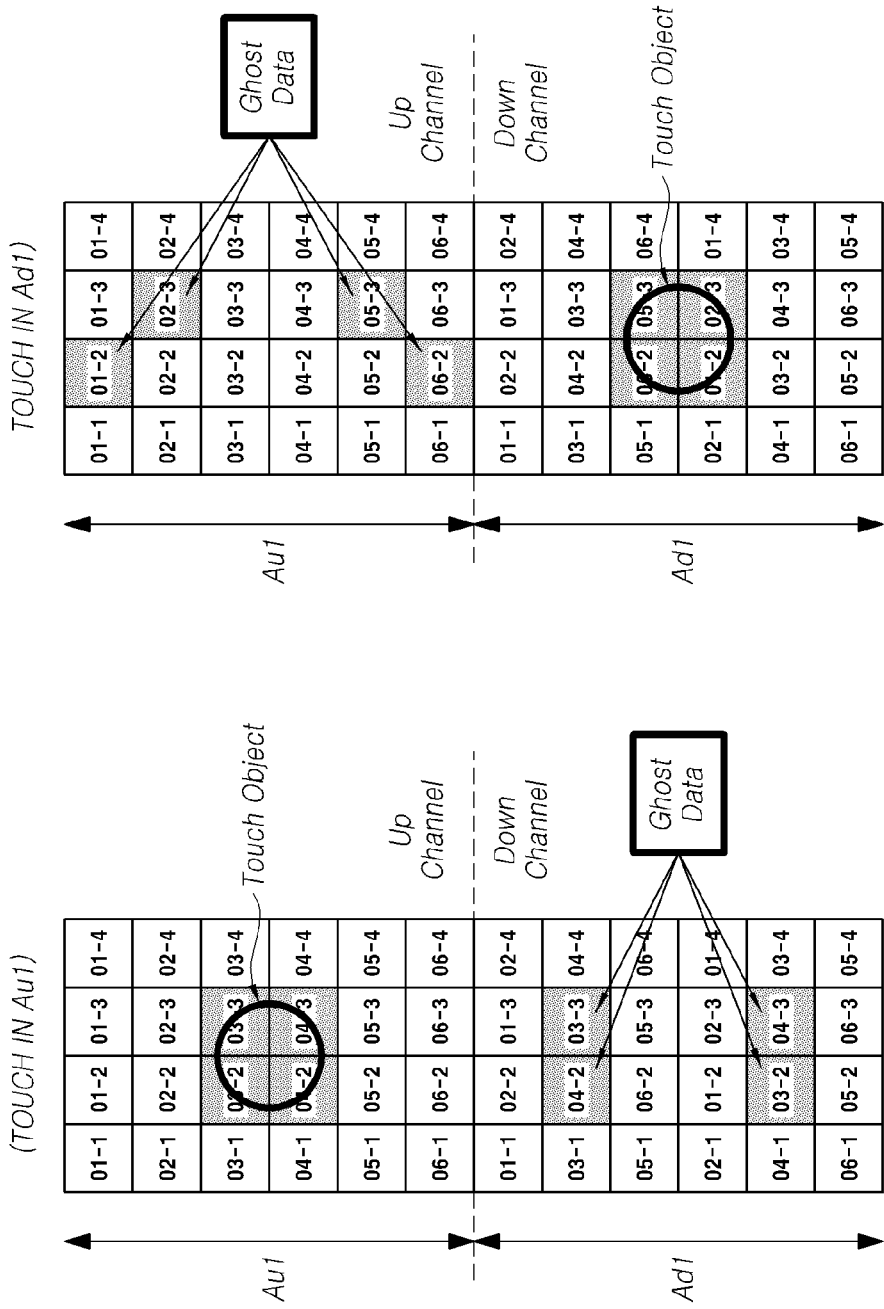

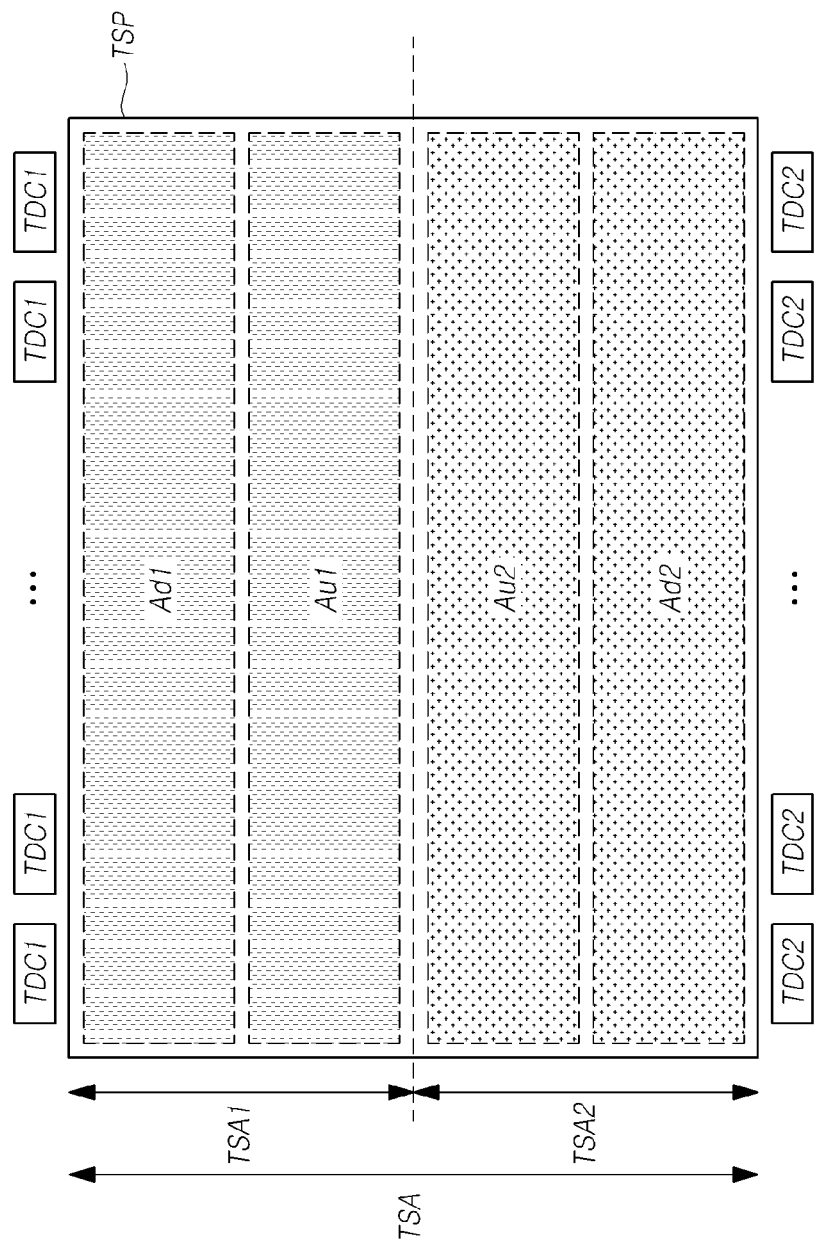

TOUCH DISPLAY DEVICE FOR REDUCING GHOST TOUCH DATA

CROSS REFERENCE TO RELATED APPLICATION

This application claims priority from Republic of Korea Patent Application No. 10-2019-0175889, filed on Dec. 27, 2019, which is hereby incorporated by reference in its entirety.

BACKGROUND

Field of the Present Disclosure

Embodiments of the present disclosure relate to a touch display device.

Discussion of the Related Art

A touch display device provides a touch-based input function of enabling a user to easily, intuitively, and conveniently input information or commands in addition to a function of displaying an image.

In order to provide such a touch-based input function, a touch display device has to ascertain a touch of a user and accurately sense touch coordinates. For this purpose, a touch display device includes a touch panel having a touch sensor structure.

A touch panel has a touch sensor structure including a plurality of touch electrodes and a plurality of touch lines that connect the touch electrodes to a touch sensing circuit. On the other hand, the touch panel further includes a plurality of touch pads (or a plurality of touch channels) that are electrically connected to the touch sensing circuit.

Since such a touch panel has a touch sensor structure that is complex or requires a plurality of layers, there is a problem in that a process of manufacturing the touch panel is complex, a manufacturing yield of the touch panel is poor, or manufacturing costs thereof are high.

When the size of a touch panel increases, the number of touch electrodes increases and the number of touch lines and the number of touch channels for transmitting a signal increases. Accordingly, there is a problem in that complexity and manufacturing costs of the touch panel increase and complexity and manufacturing costs of circuit components increase.

SUMMARY

Embodiments of the present disclosure provide a touch display device with a touch sensor structure that can decrease the number of touch lines and the number of touch channels in comparison with the number of touch electrodes.

Embodiments of the present disclosure provide a touch display device with a touch sensor structure that can decrease the number of touch lines and the number of touch channels and that is strong to a ghost which is misrecognized as a touch.

According to an aspect of the present disclosure, there is provided a touch display device including: a plurality of touch electrodes that are arranged in n rows and m columns in a touch sensing area; and a plurality of touch lines that are electrically connected to the plurality of touch electrodes.

In the touch display device, the touch sensing area is divided into k areas, where k which is the number of divided areas is a natural number of equal to or greater than 2 and n which is the number of touch electrode rows is a multiple of k.

Each of the k areas includes n/k touch electrode rows.

The k areas include a first area and a second area.

The first area includes a first touch electrode and a second touch electrode which are arranged in the same touch electrode row, and the second area includes a third touch electrode and a fourth touch electrode which are arranged in different touch electrode rows.

The plurality of touch lines include a first touch line which is electrically connected to the first touch electrode and the third touch electrode and a second touch line which is electrically connected to the second touch electrode and the fourth touch electrode.

In the first area, the first touch electrode is disposed in a first touch electrode column and the second touch electrode is disposed in a second touch electrode column subsequent to the first touch electrode column.

In the second area, the third touch electrode is disposed in the first touch electrode column and the fourth touch electrode is disposed in the second touch electrode column.

The third touch electrode is disposed in an i-th touch electrode row out of the n/k touch electrode rows included in the second area.

The fourth touch electrode is disposed in one of (n/k)−3 touch electrode rows other than the (i−1)-th touch electrode row, the i-th touch electrode row, and the (i+1)-th touch electrode row out of the n/k touch electrode rows included in the second area.

The number of touch lines may be (m×n)/Nc. Here, Nc is the number of touch electrodes connected to one touch line.

A separation distance between the third touch electrode and the fourth touch electrode may be greater than a length in a column direction of each of the plurality of touch electrodes.

The first touch line may be located between the first touch electrode and the third touch electrode and overlap the touch electrodes which are disposed in one or more of the first area and the second area.

The first area and the second area may be areas adjacent to each other.

The k areas may further include a third area which is located between the first area and the second area. The third area may include a fifth touch electrode and a sixth touch electrode which are disposed in different touch electrode rows. The first touch line may be electrically connected to the first touch electrode, the third touch electrode, and the fifth touch electrode. The second touch line may be electrically connected to the second touch electrode, the fourth touch electrode, and the sixth touch electrode. In the third area, the fifth touch electrode may be disposed in the first touch electrode column and the sixth touch electrode may be disposed in the second touch electrode column. The fifth touch electrode may be disposed in a j-th touch electrode row out of the n/k touch electrode rows included in the third area. The sixth touch electrode may be disposed in one of (n/k)−3 touch electrode rows other than the (j−1)-th touch electrode row, the j-th touch electrode row, and the (j+1)-th touch electrode row out of the n/k touch electrode rows included in the third area.

The k areas may further include a third area and a fourth area. The third area may include a fifth touch electrode and a sixth touch electrode which are disposed in the same touch electrode row. The fourth area may include a seventh touch electrode and an eighth touch electrode which are disposed in different touch electrode rows. The plurality of touch lines may further include a third touch line which is electrically connected to the fifth touch electrode and the sixth touch electrode and a fourth touch line which is electrically connected to the seventh touch electrode and the eighth touch electrode. In the third area, the fifth touch electrode may be disposed in the first touch electrode column and the sixth touch electrode is disposed in the second touch electrode column.

In the fourth area, the seventh touch electrode may be disposed in the first touch electrode column and the eighth touch electrode may be disposed in the second touch electrode column. The seventh touch electrode may be disposed in a j-th touch electrode row out of the n/k touch electrode rows included in the fourth area. The eighth touch electrode may be disposed in one of (n/k)−3 touch electrode rows other than the (j−1)-th touch electrode row, the j-th touch electrode row, and the (j+1)-th touch electrode row out of the n/k touch electrode rows included in the fourth area.

The third area may be located between the first area and the second area, and the second area may be located between the third area and the fourth area.

The touch display device may further include a touch driving circuit that is electrically connected to the first touch line, the second touch line, the third touch line, and the fourth touch line.

The touch sensing area may be divided into a first touch sensing area and a second touch sensing area. The first area and the second area may be disposed in the first touch sensing area, and the third area and the fourth area may be disposed in the second touch sensing area.

The touch display device may further include: a first touch driving circuit that is electrically connected to the first touch line and the second touch line; and a second touch driving circuit that is electrically connected to the third touch line and the fourth touch line.

Positions of the touch electrodes in the second area that are electrically connected to the touch electrodes disposed in the first touch electrode row out of the n/k touch electrode rows included in the first area may have a periodic zigzag pattern.

A pattern of the positions of the touch electrodes in the second area which are electrically connected to the touch electrodes disposed in the first touch electrode row included in the first area is same as a pattern of positions of the touch electrodes in the second area which are electrically connected to the touch electrodes disposed in a second touch electrode row different from the first touch electrode row included in the first area.

Alternatively, a pattern the positions of the touch electrodes in the second area which are electrically connected to the touch electrodes disposed in the first touch electrode row included in the first area is different from a pattern of positions of the touch electrodes in the second area which are electrically connected to the touch electrodes disposed in a second touch electrode row different from the first touch electrode row included in the first area.

The touch display device may further include a touch driving circuit that acquires a sensing value via the first touch line which is electrically connected to the first touch electrode and the third touch electrode, acquires a sensing value via the second touch line which is electrically connected to the second touch electrode and the fourth touch electrode, and outputs sensing data including the acquired sensing values.

When a touch has occurred in the first area out of the first area and the second area of the touch sensing area, positions of the touch electrodes in which a sensing value is equal to or greater than a threshold value in the first area may be gathered, and positions of the touch electrodes in which a sensing value is equal to or greater than the threshold value in the second area may be dispersed.

The touch display device may further include a touch controller that determines touch coordinates using the sensing data.

The touch controller may remove the sensing values, which are equal to or greater than the threshold value, of the touch electrodes which are scattered in positions in the second area as ghost data and determine touch coordinates on the basis of the sensing values, which are equal to or greater than the threshold value, of the touch electrodes which are gathered in positions in the first area.

The touch driving circuit may include: an up-channel multiplexer circuit that sequentially drives and senses two or more multiplexing groups which are groups of the touch electrodes disposed in the first area; a down-channel multiplexer circuit that sequentially drives and senses two or more multiplexing groups which are groups of the touch electrodes disposed in the second area; and a selection switch circuit that selects one of the up-channel multiplexer circuit and the down-channel multiplexer circuit.

The selection switch circuit may select the up-channel multiplexer circuit at the time of sensing the first area out of the first area and the second area. The selection switch circuit may select the down-channel multiplexer circuit at the time of sensing the second area out of the first area and the second area.

Each of the plurality of touch electrodes may overlap two or more data lines or two or more gate lines.

When the number of touch electrodes is defined as m×n and the number of touch lines is defined as (m×n)/Nc, the touch driving circuit may acquire sensing values via the (m×n)/Nc touch lines and output sensing data. The touch controller may determine touch coordinates in the entire area in which m×n touch electrodes are arranged using the sensing data.

The touch display device may further include a touch sensing circuit that senses the touch lines connected to the touch electrodes in the first area or the second area (a half-sensing system) and determines a touch or touch coordinates in the entire area (including the first area and the second area).

Alternatively, the touch display device may further include a touch sensing circuit that senses the touch lines connected to the touch electrodes in the first area, senses the touch lines (the same as the touch lines connected to the touch electrode disposed in the first area) connected to the touch electrodes in the second area (a full-sensing system), and determines a touch or touch coordinates in the entire area (including the first area and the second area).

According to another aspect of the present disclosure, there is provided a touch display device including: a touch panel that includes a plurality of touch electrodes and a plurality of touch lines which are electrically connected to the plurality of touch electrodes; and a touch driving circuit that supplies a touch driving signal to the plurality of touch electrodes via the plurality of touch lines.

The touch panel includes a touch sensing area including a first area in which first to fourth touch electrodes are disposed and a second area in which fifth to eighth touch electrodes are disposed.

The touch panel includes: a first touch line that is electrically connected to the first touch electrode and the fifth touch electrode via at least one contact hole; a second touch line that is electrically connected to the second touch electrode and the sixth touch electrode via at least one contact hole; a third touch line that is electrically connected to the third touch electrode and the seventh touch electrode via at least one contact hole; and a fourth touch line that is electrically connected to the fourth touch electrode and the eighth touch electrode via at least one contact hole.

The first touch electrode is disposed adjacent to the second touch electrode and the third touch electrode, and the third touch electrode is disposed adjacent to the first touch electrode and the fourth touch electrode.

The fifth touch electrode and the sixth touch electrode are separated a first separation distance from each other with one or more other touch electrodes interposed therebetween. The fifth touch electrode and the seventh touch electrode are separated a second separation distance from each other with one or more other touch electrodes interposed therebetween.

The first separation distance and the second separation distance are different from each other.

The seventh touch electrode and the eighth touch electrode may be separated the first separation distance from each other with one or more other touch electrodes interposed therebetween.

The sixth touch electrode and the eighth touch electrode may be separated the second separation distance from each other with one or more other touch electrodes interposed therebetween.

The first touch electrode and the third touch electrode are disposed in the same touch electrode row in the first area, and the second touch electrode and the fourth touch electrode are disposed in the same touch electrode row in the first area.

The fifth touch electrode and the seventh touch electrode are disposed in different touch electrode rows in the second area, and the sixth touch electrode and the eighth touch electrode are disposed in different touch electrode rows in the second area.

The first touch line may overlap the first touch electrode, the second touch electrode, the fifth touch electrode, and the sixth touch electrode. The third touch line may overlap the third touch electrode, the fourth touch electrode, the seventh touch electrode, and the eighth touch electrode. The first touch line may not overlap the third touch line.

In the touch panel, a distance of the first area from the touch driving circuit may be greater than a distance of the second area from the touch driving circuit. Alternatively, in the touch panel, a distance of the first area from the touch driving circuit may be less than a distance of the second area from the touch driving circuit.

The first separation distance may be a shortest distance between the fifth touch electrode and the sixth touch electrode, the second separation distance may be a shortest distance between the fifth touch electrode and the seventh touch electrode, and the first separation distance may be greater than the second separation distance.

According to the embodiments of the present disclosure, it is possible to provide a touch display device with a touch sensor structure that can decrease the number of touch lines and the number of touch channels in comparison with the number of touch electrodes.

According to the embodiments of the present disclosure, it is possible to provide a touch display device with a touch sensor structure that can decrease the number of touch lines and the number of touch channels and that is strong to a ghost which is misrecognized as a touch.

BRIEF DESCRIPTION OF THE DRAWINGS

FIG. 6 is a diagram illustrating a table of examples of the touch sensor structure in the touch panel of the touch display device according to the embodiments of the present disclosure;

FIGS. 10 to 12 are diagrams illustrating principal factors for a touch electrode connection structure in the touch panel of the touch display device according to the embodiments of the present disclosure;

FIGS. 13 to 17 are diagrams illustrating touch electrode connection patterns when the touch panel of the touch display device according to the embodiments of the present disclosure has the first to third touch sensor structures;

FIGS. 23 and 24 are diagrams illustrating a full-sensing method in the touch display device according to the embodiments of the present disclosure; and FIG. 25 is a diagram illustrating a large touch sensor structure of the touch display device according to the embodiments of the present disclosure.

DETAILED DESCRIPTION

Figure 1:
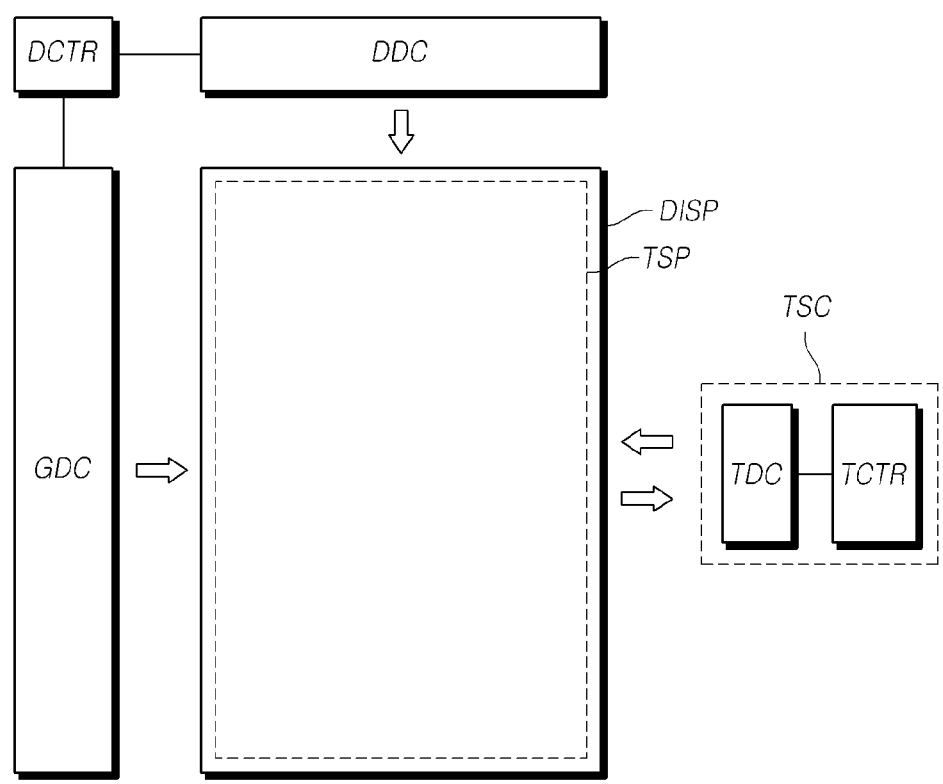
FIG. 1 is a system diagram of a touch display device according to embodiments of the present disclosure.

In embodiments of the present disclosure, a touch display device with a touch sensor structure in which two or more touch electrodes located in two or more subareas are electrically connected to each other via one touch line is disclosed. Accordingly, it is possible to decrease the number of touch lines and the number of touch channels.

In embodiments of the present disclosure, a touch display device with a touch sensor structure in which two or more touch electrodes are connected to each touch line in a touch electrode connecting structure capable of removing ghost data is disclosed. Accordingly, it is possible to improve touch sensitivity greatly.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including," "having," "containing," "constituting," "make up of," and "formed of" used herein are generally intended to allow other components to be added unless the terms are used with the term "only". As used herein, singular forms are intended to include plural forms unless the context clearly indicates otherwise.

Terms, such as "first," "second," "A," "B," "(A)," or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Figure 2:
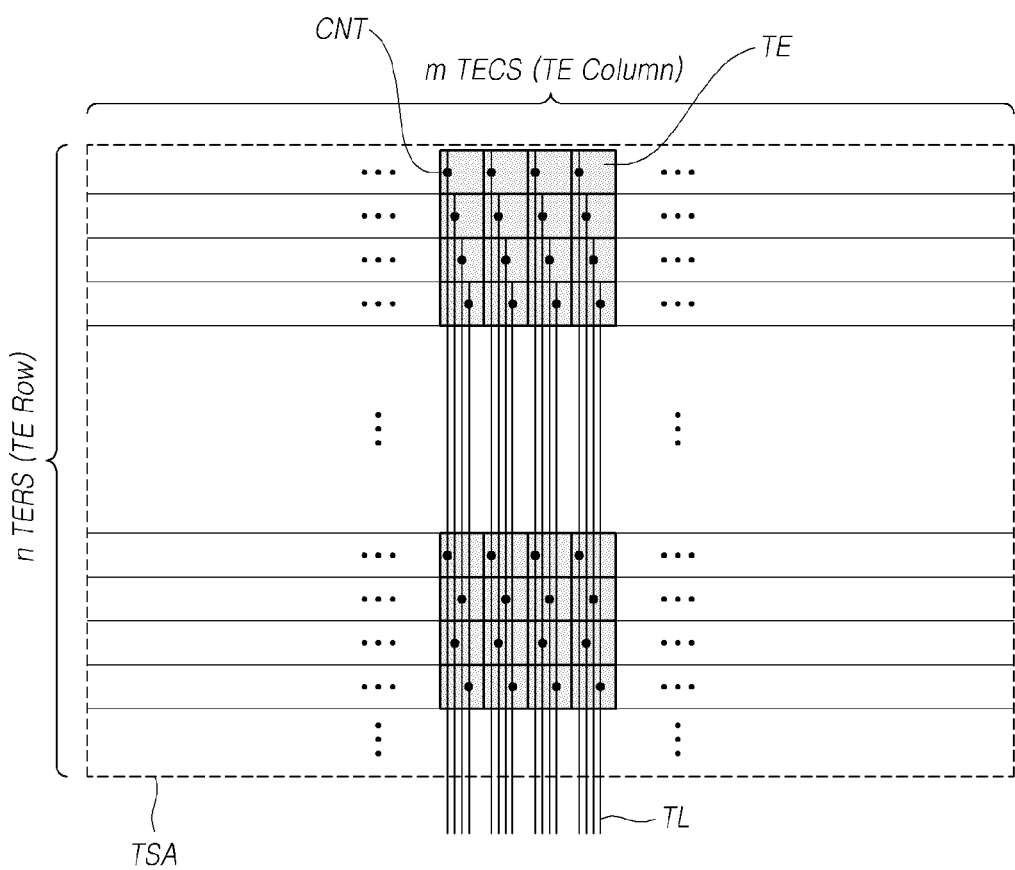
FIG. 2 is a diagram illustrating a touch panel of the touch display device according to the embodiments of the present disclosure.

FIG. 1 is a system diagram of a touch display device according to embodiments of the present disclosure. FIG. 2 is a diagram illustrating a touch panel TSP of the touch display device according to the embodiments of the present disclosure.

Referring to FIG. 1, a touch display device according to embodiments of the present disclosure provides both an image display function and a touch sensing function.

In order to provide the image display function, a touch display device according to embodiments of the present disclosure includes a display panel DISP in which a plurality of data lines and a plurality of gate lines are arranged and a plurality of subpixels defined by the plurality of data lines and the plurality of gate lines are arranged, a data driving circuit DDC that drives the plurality of data lines, a gate driving circuit GDC that drives the plurality of gate lines, and a display controller DCTR that controls operations of the data driving circuit DDC and the gate driving circuit GDC.

Each of the data driving circuit DDC, the gate driving circuit GDC, and the display controller DCTR may be embodied as one or more individual components. In some cases, two or more of the data driving circuit DDC, the gate driving circuit GDC, and the display controller DCTR may be integrated and embodied as a single component. For example, the data driving circuit DDC and the display controller DCTR may be embodied as a single integrated circuit chip (IC chip).

In order to provide the touch sensing function, the display device according to embodiments of the present disclosure includes a touch panel TSP that includes a plurality of touch electrodes and a touch sensing circuit TSC that supplies a touch driving signal to the touch panel TSP, detects a touch sensing signal from the touch panel TSP, and senses a touch or a touch position (touch coordinates) of a user with the touch panel TSP on the basis of the detected touch sensing signal.

The touch sensing circuit TSC includes, for example, a touch driving circuit TDC that supplies a touch driving signal to the touch panel TSP and detects a touch sensing signal from the touch panel TSP and a touch controller TCTR that senses a touch and/or a touch position of a user with the touch panel TSP on the basis of the touch sensing signal detected by the touch driving circuit TDC.

The touch driving circuit TDC includes a first circuit part that supplies a touch driving signal to the touch panel TSP and a second circuit part that detects a touch sensing signal from the touch panel TSP. The first circuit part and the second circuit part may be integrated into a single part or may be separated from each other.

The touch driving circuit TDC and the touch controller TCTR may be integrated and embodied as separate components or may be incorporated into a single component.

On the other hand, the data driving circuit DDC, the gate driving circuit GDC, and the touch driving circuit TDC can be embodied as one or more integrated circuits, and can be embodied in a chip-on-glass (COG) type, a chip-on-film (COF) type, a tape carrier package (TCP) type, or the like in view of electrical connection to the display panel TSP. The gate driving circuit GDC may be embodied in a gate-in-panel (GIP) type.

On the other hand, circuit elements DDC, GDC, and DCTR for display driving and circuit elements TDC and TCTR for touch driving and sensing can be embodied as one or more independent components. In some cases, one or more of the circuit element DDC, GDC, and DCTR for display driving and one or more of the circuit elements TDC and TCTR for touch driving and sensing may be functionally integrated and embodied as one or more components. For example, the data driving circuit DDC and the touch driving circuit TDC may be integrated and embodied as one or two or more integrated circuits. When the data driving circuit DDC and the touch driving circuit TDC are integrated and embodied as two or more integrated circuits, each of the two or more integrated circuits has a data driving function and a touch driving function.

Referring to FIG. 2, the touch panel TSP includes a touch sensing area TSA in which touch sensing is possible. A plurality of touch electrodes TE and a plurality of touch lines TL are arranged in the touch sensing area TSA.

In the touch sensing area TSA of the touch panel TSP, the plurality of touch electrodes TE are arranged in n rows and m columns. In this arrangement, n touch electrode rows (TE Row: TER) and M touch electrode columns (TE Column: TEC) are provided in the touch sensing area TSA of the touch panel TSP.

Each of the plurality of touch electrodes TE is electrically connected to the corresponding touch line TL via one or more contact holes CNT.

Each of the plurality of touch lines TL overlaps one or more touch electrodes TE. For example, the plurality of touch lines TL are arranged to be parallel to the plurality of data lines or the plurality of gate lines.

Each of the plurality of touch electrodes TE overlaps two or more data lines or two or more gate lines. Each of the plurality of touch electrodes TE overlaps two or more subpixels (subpixel areas).

The size of each of the plurality of touch electrodes TE may correspond to an area size of one subpixel for display or correspond to an area size of two or more subpixels.

Each plurality of touch electrodes TE may be of a plate type without an opening or may be of a mesh type with one or more openings.

When one touch electrode TE is of a mesh type and has a size corresponding to the area size of two or more subpixels, one touch electrode TE includes two or more openings and the position and size of each of the two or more openings corresponds to the position and size of an emission area of each subpixel.

On the other hand, the plurality of touch electrodes TE may be dedicated electrodes for touch sensing or may further have a function of a common electrode which is supplied with a common voltage at the time of display driving. Particularly, when the touch panel TSP is incorporated in the display panel DISP, the plurality of touch electrodes TE can perform the function of a touch sensor and the function of a common electrode.

The touch panel TSP may be provided outside of the display panel DISP. That is, the touch panel TSP and the display panel DISP may be separately manufactured and then coupled to each other. This touch panel TSP is referred to as an outer-mounted type or an add-on type.

On the other hand, the touch panel TSP may be incorporated into the display panel DISP. That is, when the display panel DISP is manufactured, touch sensor structures such as a plurality of touch electrodes TE and a plurality of touch lines TL constituting the touch panel TSP may be formed along with electrodes and signal lines for display driving. This touch panel TSP is referred to as an inner-mounted type.

On the other hand, the touch display device according to embodiments of the present disclosure may be a liquid crystal display (LCD), an organic light emitting diode (OLED) display, or a quantum dot display, but is not limited thereto and may be any type of display as long as touch sensor elements, touch sensor structures, and a touch sensing method which will be described below can be applied thereto.

For example, when the touch display device according to embodiments of the present disclosure is a liquid crystal display device, the touch electrodes TE may be common electrodes which are provided in the display panel DISP and which are supplied with a common voltage for display driving.

For example, when the touch display device according to embodiments of the present disclosure is an OLED display, the touch display device may have a top emission structure in which light is emitted from the top of the display panel DISP or a bottom emission structure in which light is emitted from the bottom of the display panel DISP.

When the touch display device according to embodiments of the present disclosure is an OLED display, the touch electrodes TE are provided in the display panel DISP and on an encapsulation layer which is located on transistors and organic light emitting diodes (OLED). The positions of these touch electrodes TE may be further suitable for the top emission structure.

When the touch display device according to embodiments of the present disclosure is an OLED display, the touch electrodes TE may be anode electrodes of organic light emitting diodes (OLED) provided in the display panel DISP or may be electrodes in various layers located below the anode electrodes. The positions of these touch electrodes TE may be further suitable for the bottom emission structure.

The touch electrodes TE included in the touch display device according to embodiments of the present disclosure may be of a mesh type with openings for improving emission efficiency and may be transparent electrodes or may further include transparent electrodes.

The touch electrodes TE included in the touch display device according to embodiments of the present disclosure may be dedicated electrodes for touch sensing or may be electrodes which can be used for both display driving and touch sensing.

Figure 3:
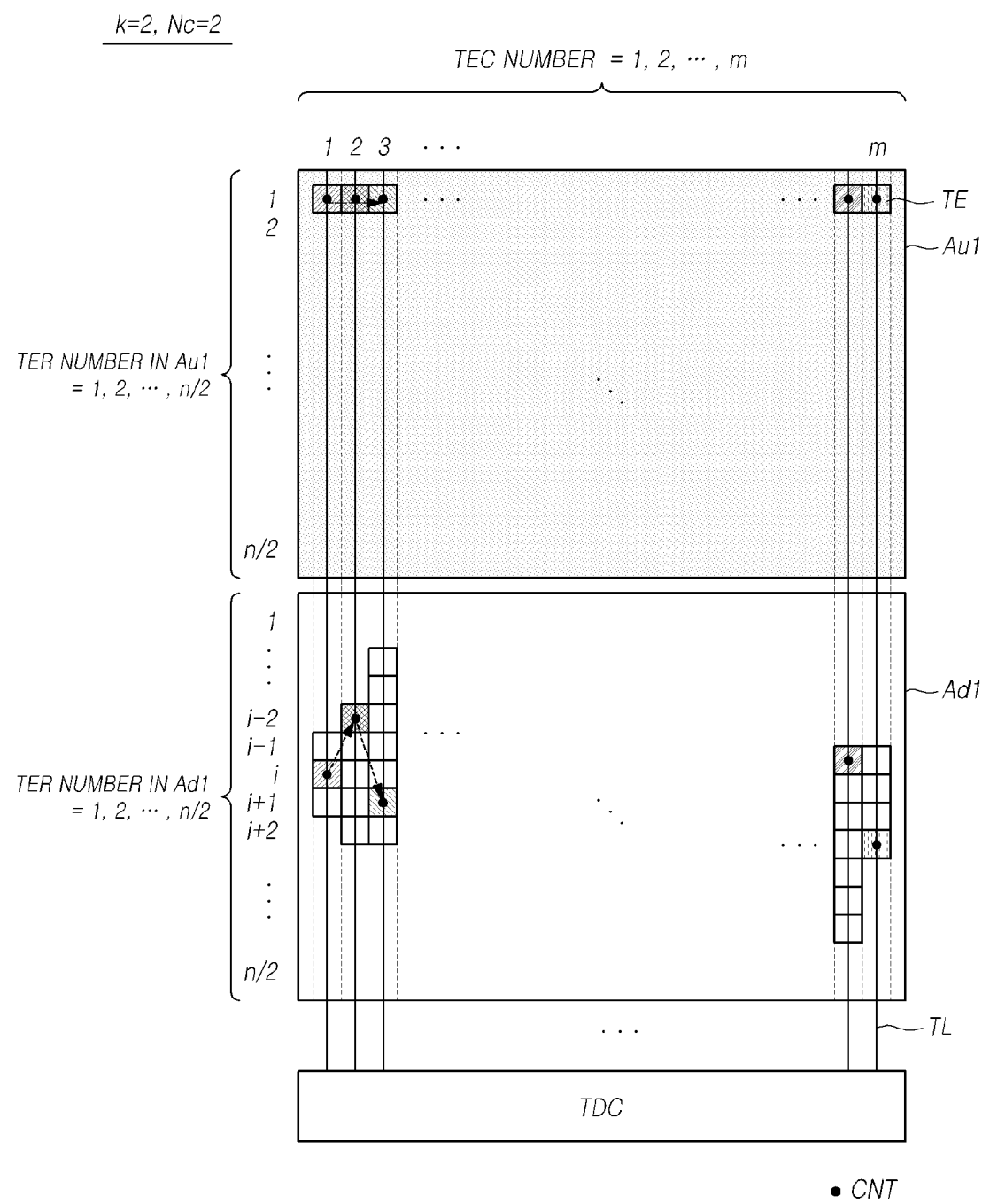
FIGS. 3 to 5 are diagrams illustrating three examples of a touch sensor structure in the touch panel of the touch display device according to the embodiments of the present disclosure.
Figure 4:
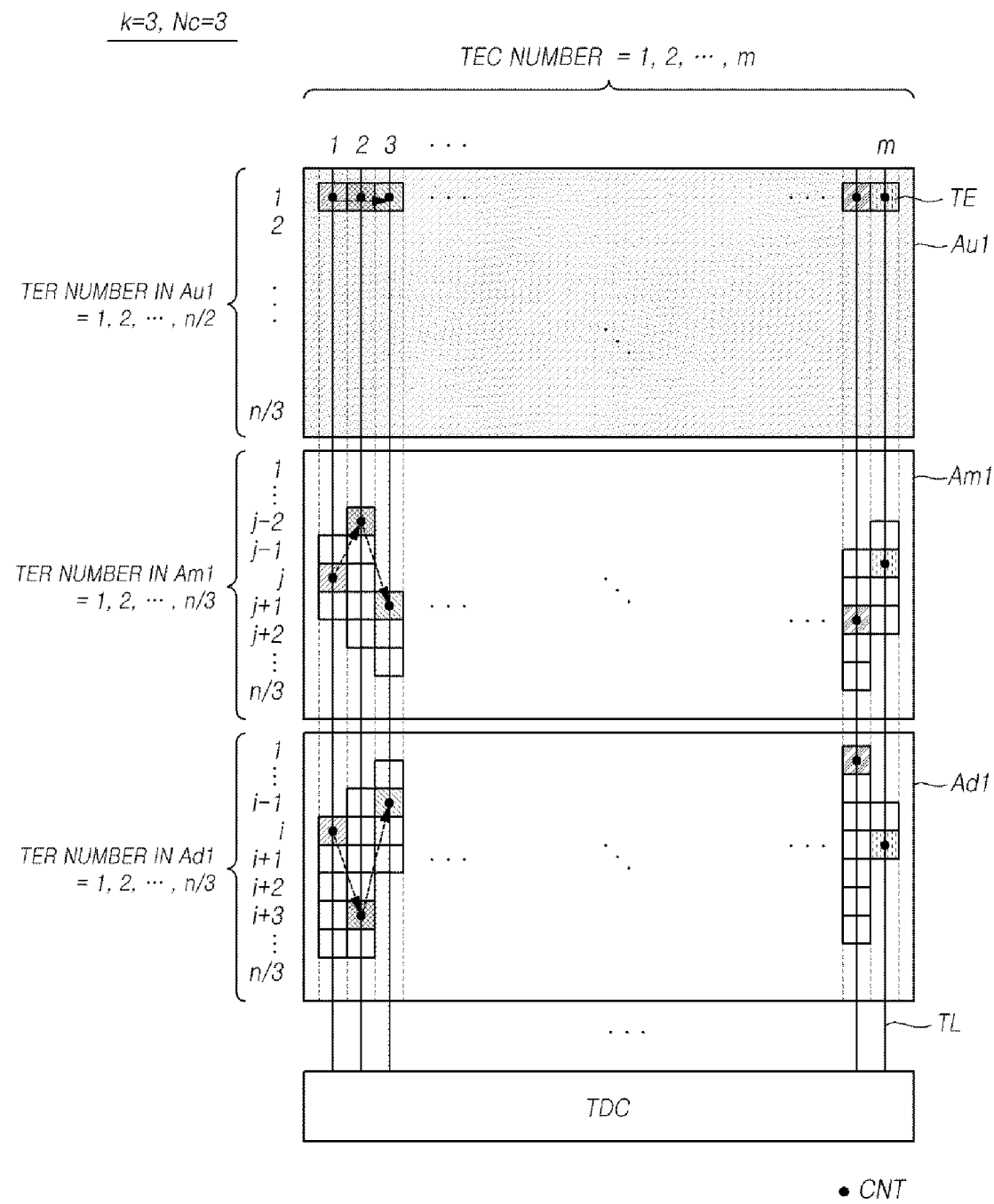
Figure 5:
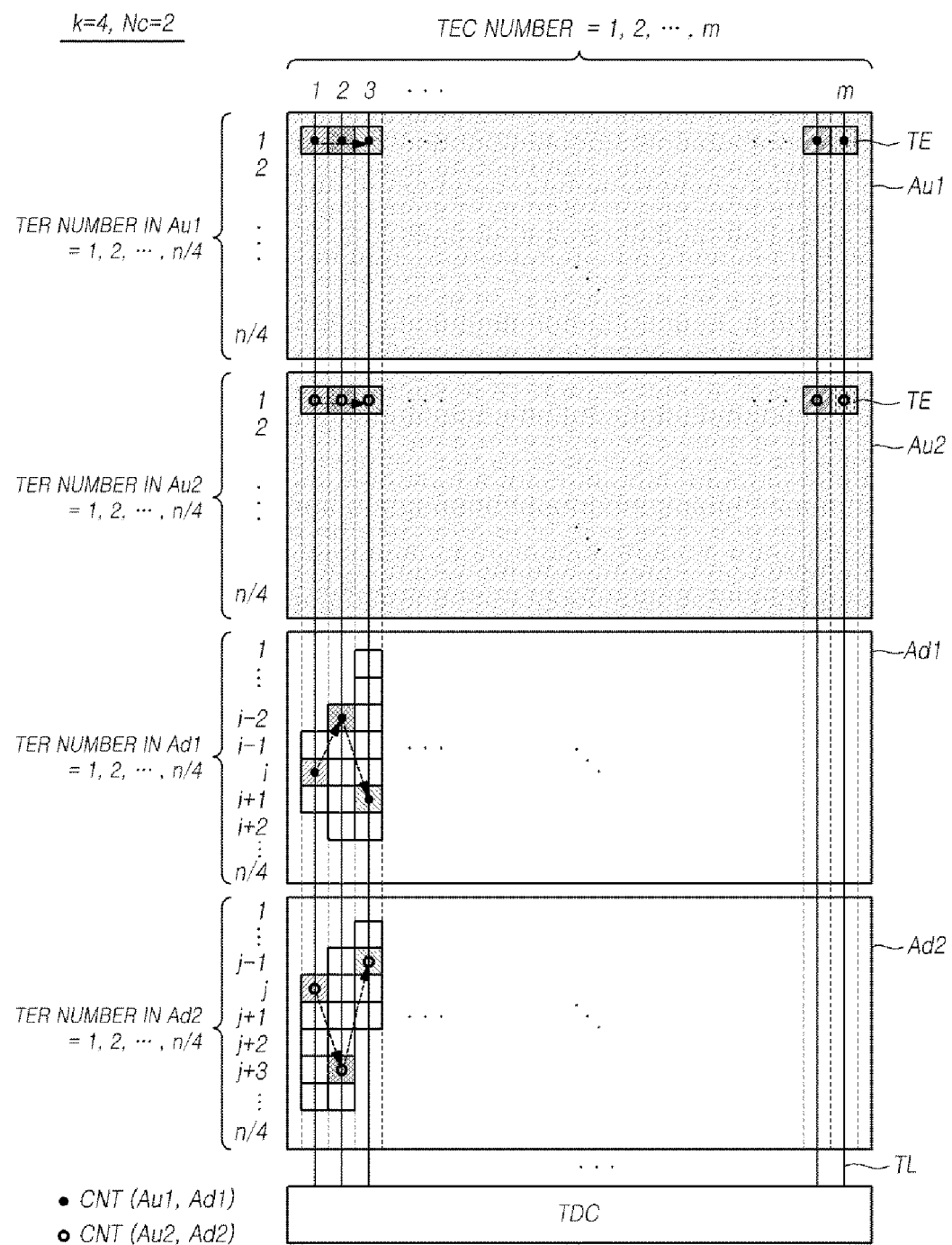

FIGS. 3 to 5 are diagrams illustrating three examples of a touch sensor structure in the touch panel TSP of the touch display device according to the embodiments of the present disclosure.

Referring to FIGS. 3 to 5, the touch panel TSP of the touch display device according to embodiments of the present disclosure includes m×n touch electrodes TE which are arranged in n rows and m columns in the touch sensing area TSA and a plurality of touch lines TL which are electrically connected to the m×n touch electrodes TE.

The touch sensing area TSA of the touch panel TSP is divided into k subareas.

Here, k which is the number of divided areas (the number of subareas) is a natural number which is equal to or greater than 2. In addition, n which is the number of touch electrode rows is a multiple of k which is the number of divided areas, and m which is the number of touch electrode columns is a natural number of which is equal to or greater than 2.

Each of the k subareas includes n/k touch electrode rows TER.

For example, in a first touch sensor structure illustrated in FIG. 3, the number of divided areas k is 2. In this case, the touch sensing area TSA of the touch panel TSP is divided into two areas Au1 and Ad1. That is, the touch sensing area TSA of the touch panel TSP is divided into a first area Au1 and a second area Ad1.

In the first touch sensor structure, the first area Au1 and the second area Ad1 are areas adjacent to each other.

In the first area Au1 and the second area Ad1, n/2 touch electrode rows TER which are different from each other are disposed.

In the first area Au1 and the second area Ad1, m touch electrode columns TEC which are the same are disposed.

For example, in a second touch sensor structure illustrated in FIG. 4, the number of divided areas k is 3. In this case, the touch sensing area TSA of the touch panel TSP is divided into three areas Au1, Am1, and Ad1. That is, the touch sensing area TSA of the touch panel TSP is divided into a first area Au1, a third area Am1, and a second area Ad1. The third area Am1 is located between the first area Au1 and the second area Ad1.

In the second touch sensor structure, the third area Am1 is located between the first area Au1 and the second area Ad1.

In the first area Au1, the second area Ad1, and the third area Am1, n/3 touch electrode rows TER which are different from each other are disposed.

In the first area Au1, the second area Ad1, and the third area Am1, m touch electrode columns TEC which are the same are disposed.

For example, in a third touch sensor structure illustrated in FIG. 5, the number of divided areas k is 4. In this case, the touch sensing area TSA of the touch panel TSP is divided into four areas Au1, Ad1, Au2, and Ad2.

In the first area Au1, the second area Ad1, the third area Au2, and the fourth area Ad2, n/4 touch electrode rows TER which are different from each other are disposed.

In the first area Au1, the second area Ad1, the third area Au2, and the fourth area Ad2, m touch electrode columns TEC which are the same are disposed.

In a more specific example of the third touch sensor structure, when the number of divided areas k is 4, the third area Au2 is located between the first area Au1 and the second area Ad1, and the second area Ad1 is located between the third area Au2 and the fourth area Ad2. That is, four areas Au1, Ad1, Au2, and Ad2 are arranged in the order of the first area Au1, the third area Au2, the second area Ad1, and the fourth area Ad2. In the third touch sensor structure, the first area Au1 and the second area Ad1 are not areas adjacent to each other, and another area Au2 is located between the first area Au1 and the second area Ad1.

In another specific example of the third touch sensor structure, when the number of divided areas k is 4, the first area Au1 and the second area Ad1 in the touch sensing area TSA of the touch panel TSP are disposed adjacent to each other, and the third area Au2 and the fourth area Ad2 are also disposed adjacent to each other (see FIG. 25). In another specific example of the third touch sensor structure, the first area Au1 and the second area Ad1 are areas adjacent to each other.

Three touch sensor structures illustrated in FIGS. 3 to 5 are different from each other in the number of touch electrodes TE (Nc) which are electrically connected to one touch line TL, in addition to the number of divided areas.

Referring to FIG. 3, in the first touch sensor structure, the number of divided areas is 2 (k=2) and the number of touch electrodes connected to one touch line TL is 2 (Nc=2). That is, two touch electrodes TE are electrically connected to one touch line TL. One of the two touch electrodes TE electrically connected to one touch line TL is disposed in the first area Au1, and the other is disposed in the second area Ad1.

Referring to FIG. 4, in the second touch sensor structure, the number of divided areas is 3 (k=3) and the number of touch electrodes connected to one touch line TL is 3 (Nc=3). One of three touch electrodes TE electrically connected to one touch line TL is disposed in the first area Au1, another is disposed in the second area Ad1, and the other is disposed in the third area Am1.

Referring to FIG. 5, in the third touch sensor structure, the number of divided areas is 4 (k=4) and the number of touch electrodes connected to one touch line TL is 2 (Nc=2). In the first area Au1 and the second area Ad1, one of the two touch electrodes TE electrically connected to one touch line TL is disposed in the first area Au1, and the other is disposed in the second area Ad1. In the third area Au2 and the fourth area Ad2, one of the two touch electrodes TE electrically connected to one touch line TL is disposed in the third area Au2, and the other is disposed in the fourth area Ad2.

Referring to FIGS. 3 to 5, the number of touch lines TL disposed in the touch panel TSP is (m×n)/Nc. Nc is the number of touch electrodes TE connected to one touch line TL, is a natural number of equal to or greater than 2, and includes an aliquot of m or n. The number of touch lines TL disposed in the touch panel TSP corresponds to the number of touch channels which has to be provided in the touch driving circuit TDC.

On the other hand, when an area is not divided (that is, k=1), the number of touch lines (the number of touch channels) is m×n. With the touch sensor structures illustrated in FIGS. 3 to 5, the number of touch lines (the number of touch channels) decreases to (m×n)/Nc depending on the number of divided areas.

The first touch sensor structure will be described below in more detail with reference to FIG. 3.

Referring to FIG. 3, the first area Au1 out of two divided areas Au1 and Ad1 in the touch panel TSP includes a first touch electrode TE and a second touch electrode TE which are disposed in the same touch electrode row TER, and the second area Ad1 includes a third touch electrode TE and a fourth touch electrode TE which are disposed in different touch electrode rows TER.

The first touch electrode TE is an arbitrary touch electrode TE which is located in the first area Au1 and is, for example, a touch electrode which is disposed in the first touch electrode row TER and the first touch electrode column TEC in the first area Au1.

The second touch electrode TE is an arbitrary touch electrode TE which is located in the first area Au1, is a touch electrode which is located in the same touch electrode row as the first touch electrode TE, and is, for example, a touch electrode which is disposed in the first touch electrode row TER and the second touch electrode column TEC in the first area Au1.

The third touch electrode TE is a touch electrode which is disposed in the i-th touch electrode row TER and the first touch electrode column TEC in the second area Ad1.

The fourth touch electrode TE is a touch electrode which is disposed in the second touch electrode column TEC in the second area Ad1 and which is not disposed in the (i−1)-th touch electrode row TER, the i-th touch electrode row TER, and the (i+1)-th touch electrode row TER. In the example illustrated in FIG. 3, the fourth touch electrode TE is a touch electrode which is disposed in the second touch electrode column TEC and the (i−2)-th touch electrode row TER in the second area Ad1.

That is, the fourth touch electrode TE is a touch electrode which is located at a position of which a separation distance from the third touch electrode TE is greater than a length in the column direction of one touch electrode TE. This rule for a touch electrode connection structure can be applied to all the touch electrodes TE and all the touch sensor structures.

Referring to FIG. 3, the plurality of touch lines TL include a first touch line TL which is electrically connected to the first touch electrode TE and the third touch electrode TE and a second touch line TL which is electrically connected to the second touch electrode TE and the fourth touch electrode TE.

As described above, in the first area Au1, the first touch electrode TE is disposed in the first touch electrode column TEC and the second touch electrode TE is disposed in the second touch electrode column TEC subsequent to the first touch electrode column TEC. In the second area Ad1, the third touch electrode TE is disposed in the first touch electrode column TEC and the fourth touch electrode TE is disposed in the second touch electrode column TEC.

As described above, the third touch electrode TE is disposed in the i-th touch electrode row TER out of the n/k touch electrode rows TER included in the second area Ad1, and the fourth touch electrode TE is disposed in one of the (n/k)−3 touch electrode rows TER other than the (i−1)-th touch electrode row TER, the i-th touch electrode row TER, and the (i+1)-th touch electrode row TER out of the n/k touch electrode rows TER included in the second area Ad1.

Referring to the first touch sensor structure illustrated in FIG. 3, the number of touch lines TL disposed in the touch panel TSP is (m×n)/2. In the first touch sensor structure illustrated in FIG. 3, the number of touch electrodes TE (Nc) connected to one touch line TL is 2. Accordingly, the number of touch channels which has to be provided in the touch driving circuit TDC corresponds to (m×n)/2.

Referring to FIG. 3, the separation distance between the third touch electrode TE and the fourth touch electrode TE is greater than the length in the column direction of each of the plurality of touch electrodes TE.

Referring to FIG. 3, the first touch electrode TE and the third touch electrode TE which are disposed in the two areas Au1 and Ad1, respectively, are electrically connected to the touch driving circuit TDC via the first touch line TL, and are driven and sensed. The second touch electrode TE and the fourth touch electrode TE which are disposed in the two areas Au1 and Ad1, respectively, are electrically connected to the touch driving circuit TDC via the second touch line TL, and are driven and sensed.

As will be described later, the touch driving circuit TDC acquires a sensing value via the first touch line TL which is electrically connected to the first touch electrode TE and the third touch electrode TE, acquires a sensing value via the second touch line TL which is electrically connected to the second touch electrode TE and the fourth touch electrode TE, and outputs sensing data including the acquired sensing values.

When a touch has occurred in the first area Au1 out of the first area Au1 and the second area Ad1 in the touch sensing area TSA, the positions of the touch electrodes TE of which the sensing value is equal to or greater than a threshold value in the first area Au1 are gathered, and the positions of the touch electrodes TE of which the sensing value is equal to or greater than a threshold value in the second area Ad1 are dispersed.

The first touch line TL which is electrically connected to the first touch electrode TE and the third touch electrode TE overlaps a touch electrode which is located between the first touch electrode TE and the third touch electrode TE and which is disposed in the first area Au1 and/or the second area Ad1.

However, the first touch line TL which is electrically connected to the first touch electrode TE and the third touch electrode TE is not electrically connected to the touch electrode which is located between the first touch electrode TE and the third touch electrode TE and which overlaps the first touch line TL.

The second touch sensor structure will be described below in more detail with reference to FIG. 4.

Referring to FIG. 4, the second touch sensor structure is different from the first touch sensor structure, in that the number of divided areas k is greater by one and a third area Am1 is further provided between the first area Au1 and the second area Ad1.

Referring to FIG. 4, the second touch sensor structure is also different from the first touch sensor structure, in that the number of touch electrodes Nc which are electrically connected to one touch line TL is greater by one. That is, one touch electrode TE in the first area Au1, one touch electrode TE in the second area Ad1, and one touch electrode TE in the third area Am1 are electrically connected to one touch line TL.

Referring to FIG. 4, the first area Au1 out of three divided areas Au1, Am1, and Ad1 in the touch panel TSP includes a first touch electrode TE and a second touch electrode TE which are disposed in the same touch electrode row TER, the second area Ad1 includes a third touch electrode TE and a fourth touch electrode TE which are disposed in different touch electrode rows TER, and the third area Am1 includes a fifth touch electrode TE and a sixth touch electrode TE which are disposed in different touch electrode rows TER.

The first touch electrode TE is a touch electrode which is disposed in the first touch electrode row TER and the first touch electrode column TEC in the first area Au.

The second touch electrode TE is a touch electrode which is disposed in the first touch electrode row TER and the second touch electrode column TEC in the first area Au1.

The third touch electrode TE is a touch electrode which is disposed in the i-th touch electrode row TER and the first touch electrode column TEC in the second area Ad1.

The fourth touch electrode TE is a touch electrode which is disposed in the second touch electrode column TEC in the second area Ad1 and which is not disposed in the (i−1)-th touch electrode row TER, the i-th touch electrode row TER, and the (i+1)-th touch electrode row TER. In the example illustrated in FIG. 4, the fourth touch electrode TE is a touch electrode which is disposed in the second touch electrode column TEC and the (i+3)-th touch electrode row TER in the second area Ad1. That is, the fourth touch electrode TE is a touch electrode which is located at a position of which a separation distance from the third touch electrode TE is greater than a length in the column direction of one touch electrode TE. This rule for a touch electrode connection structure can be applied to all the touch electrodes TE and all the touch sensor structures.

Referring to FIG. 4, the separation distance between the third touch electrode TE and the fourth touch electrode TE is greater than the length in the column direction of each of the plurality of touch electrodes TE.

The fifth touch electrode TE is a touch electrode which is disposed in the j-th touch electrode row TER and the first touch electrode column TEC in the third area Am1.

The sixth touch electrode TE is a touch electrode which is disposed in the second touch electrode column TEC in the third area Am1 and which is not disposed in the (j−1)-th touch electrode row TER, the j-th touch electrode row TER, and the (j+1)-th touch electrode row TER. In the example illustrated in FIG. 4, the sixth touch electrode TE is a touch electrode which is disposed in the second touch electrode column TEC and the (j−2)-th touch electrode row TER in the third area Am1. That is, the sixth touch electrode TE is a touch electrode which is located at a position of which a separation distance from the fifth touch electrode TE is greater than the length in the column direction of one touch electrode TE. This rule for a touch electrode connection structure can be applied to all the touch electrodes TE and all the touch sensor structures.

Referring to FIG. 4, the separation distance between the fifth touch electrode TE and the sixth touch electrode TE is greater than the length in the column direction of each of the plurality of touch electrodes TE.

Referring to FIG. 4, the plurality of touch lines TL include a first touch line TL which is electrically connected to the first touch electrode TE, the third touch electrode TE, and the fifth touch electrode TE disposed in the three areas Au1, Ad1, and Am1, respectively, and a second touch line TL which is electrically connected to the second touch electrode TE, the fourth touch electrode TE, and the sixth touch electrode TE disposed in the three areas Au1, Ad1, and Am1, respectively.

As described above, in the first area Au1, the first touch electrode TE is disposed in the first touch electrode column TEC and the second touch electrode TE is disposed in the second touch electrode column TEC subsequent to the first touch electrode column TEC. In the second area Ad1, the third touch electrode TE is disposed in the first touch electrode column TEC and the fourth touch electrode TE is disposed in the second touch electrode column TEC.

As described above, the third touch electrode TE is disposed in the i-th touch electrode row TER out of the n/k touch electrode rows TER included in the second area Ad1, and the fourth touch electrode TE is disposed in one of the (n/k)−3 touch electrode rows TER other than the (i−1)-th touch electrode row TER, the i-th touch electrode row TER, and the (i+1)-th touch electrode row TER out of the n/k touch electrode rows TER included in the second area Ad1.

The fifth touch electrode TE is disposed in the j-th touch electrode row TER out of the n/k touch electrode rows TER included in the third area Am1, and the sixth touch electrode TE is disposed in one of the (n/k)−3 touch electrode rows TER other than the (j−1)-th touch electrode row TER, the j-th touch electrode row TER, and the (j+1)-th touch electrode row TER out of the n/k touch electrode rows TER included in the third area Am1.

Referring to the second touch sensor structure illustrated in FIG. 4, the number of touch lines TL disposed in the touch panel TSP is (m×n)/3. In the second touch sensor structure illustrated in FIG. 4, the number of touch electrodes TE (Nc) connected to one touch line TL is 3. Accordingly, the number of touch channels which has to be provided in the touch driving circuit TDC corresponds to (m×n)/3.

Referring to FIG. 4, the first touch electrode TE, the third touch electrode TE, and the fifth touch electrode TE which are disposed in the three areas Au1, Ad1, and Am1, respectively, are electrically connected to the touch driving circuit TDC via the first touch line TL, and are driven and sensed. The second touch electrode TE, the fourth touch electrode TE, and the sixth touch electrode TE which are disposed in the three areas Au, Ad1, and Am1, respectively, are electrically connected to the touch driving circuit TDC via the second touch line TL, and are driven and sensed.

As will be described later, the touch driving circuit TDC acquires a sensing value via the first touch line TL which is electrically connected to the first touch electrode TE, the third touch electrode TE, and the fifth touch electrode TE, acquires a sensing value via the second touch line TL which is electrically connected to the second touch electrode TE, the fourth touch electrode TE, and the sixth touch electrode TE, and outputs sensing data including the acquired sensing values.

When a touch has occurred in the first area Au1 out of the three areas Au1, Ad1, and Am1 in the touch sensing area TSA, the positions of the touch electrodes TE of which the sensing value is equal to or greater than a threshold value in the first area Au1 are gathered, the positions of the touch electrodes TE of which the sensing value is equal to or greater than a threshold value in the second area Ad1 are dispersed, and the positions of the touch electrodes TE of which the sensing value is equal to or greater than a threshold value in the third area Am1 are dispersed.

The third touch sensor structure will be described below in more detail with reference to FIG. 5.

Referring to FIG. 5, the number of divided areas k in the third touch sensor structure is four. That is, four areas into which the touch sensing area TSA of the touch panel TSP is divided include a third area Au2 and a fourth area Ad2 in addition to the first area Au1 and the second area Ad1.

Referring to FIG. 5, the number of touch electrodes Nc which are electrically connected to one touch line in the third touch sensor structure is two. One touch electrode TE in the first area Au1 and one touch electrode TE in the second area Ad1 are electrically connected to one touch line TL. One touch electrode TE in the third area Au2 and one touch electrode TE in the fourth area Ad2 are electrically connected to one touch line TL.

Referring to FIG. 5, the first area Au1 and the second area Ad1 out of four divided areas Au1, Ad1, Au2, and Ad2 in the touch panel TSP are corresponding areas having a touch line sharing structure, and the third area Au2 and the fourth area Ad2 are corresponding areas having a touch line sharing structure.

The first area Au1 includes a first touch electrode TE and a second touch electrode TE which are disposed in the same touch electrode row TER, and the second area Ad includes a third touch electrode TE and a fourth touch electrode TE which are disposed in different touch electrode rows TER.

The third area Au2 includes a fifth touch electrode TE and a sixth touch electrode TE which are disposed in the same touch electrode row TER, and the fourth area Ad2 includes a seventh touch electrode TE and an eighth touch electrode TE which are disposed in different touch electrode rows TER.

The first touch electrode TE is a touch electrode which is disposed in the first touch electrode row TER and the first touch electrode column TEC in the first area Au. The second touch electrode TE is a touch electrode which is disposed in the first touch electrode row TER and the second touch electrode column TEC in the first area Au1.

The third touch electrode TE is a touch electrode which is disposed in the i-th touch electrode row TER and the first touch electrode column TEC in the second area Ad. The fourth touch electrode TE is a touch electrode which is disposed in the second touch electrode column TEC in the second area Ad1 and which is not disposed in the (i−1)-th touch electrode row TER, the i-th touch electrode row TER, and the (i+1)-th touch electrode row TER. In the example illustrated in FIG. 5, the fourth touch electrode TE is a touch electrode which is disposed in the second touch electrode column TEC and the (i−2)-th touch electrode row TER in the second area Ad1. That is, the fourth touch electrode TE is a touch electrode which is located at a position of which a separation distance from the third touch electrode TE is greater than a length in the column direction of one touch electrode TE. This rule for a touch electrode connection structure can be applied to all the touch electrodes TE and all the touch sensor structures.

The fifth touch electrode TE is a touch electrode which is disposed in the first touch electrode row TER and the first touch electrode column TEC in the third area Au2. The sixth touch electrode TE is a touch electrode which is disposed in the first touch electrode row TER and the second touch electrode column TEC in the third area Au2.

The seventh touch electrode TE is a touch electrode which is disposed in the j-th touch electrode row TER and the first touch electrode column TEC in the fourth area Ad2. The eighth touch electrode TE is a touch electrode which is disposed in the second touch electrode column TEC in the fourth area Ad2 and which is not disposed in the (j−1)-th touch electrode row TER, the j-th touch electrode row TER, and the (j+1)-th touch electrode row TER. In the example illustrated in FIG. 5, the eighth touch electrode TE is a touch electrode which is disposed in the second touch electrode column TEC and the (j+3)-th touch electrode row TER in the fourth area Ad2. That is, the eighth touch electrode TE is a touch electrode which is located at a position of which a separation distance from the seventh touch electrode TE is greater than a length in the column direction of one touch electrode TE. This rule for a touch electrode connection structure can be applied to all the touch electrodes TE and all the touch sensor structures.

Referring to FIG. 5, the plurality of touch lines TL include a first touch line TL which is electrically connected to the first touch electrode TE and the third touch electrode TE and a second touch line TL which is electrically connected to the second touch electrode TE and the fourth touch electrode TE.

The plurality of touch lines TL further include a third touch line TL which is electrically connected to the fifth touch electrode TE and the seventh touch electrode TE and a fourth touch line TL which is electrically connected to the sixth touch electrode TE and the eighth touch electrode TE.

In the first area Au1, the first touch electrode TE is disposed in the first touch electrode column TEC and the second touch electrode TE is disposed in the second touch electrode column TEC subsequent to the first touch electrode column TEC. In the second area Ad1, the third touch electrode TE is disposed in the first touch electrode column TEC and the fourth touch electrode TE is disposed in the second touch electrode column TEC.

In the third area Au2, the fifth touch electrode TE is disposed in the first touch electrode column TEC and the sixth touch electrode TE is disposed in the second touch electrode column TEC. In the fourth area Ad2, the seventh touch electrode TE is disposed in the first touch electrode column TEC and the eighth touch electrode TE is disposed in the second touch electrode column TEC.

As described above, the third touch electrode TE is disposed in the i-th touch electrode row TER out of the n/k touch electrode rows TER included in the second area Ad1, and the fourth touch electrode TE is disposed in one of the (n/k)−3 touch electrode rows TER other than the (i−1)-th touch electrode row TER, the i-th touch electrode row TER, and the (i+1)-th touch electrode row TER out of the n/k touch electrode rows TER included in the second area Ad1.

As described above, the seventh touch electrode TE is disposed in the j-th touch electrode row TER out of the n/k touch electrode rows TER included in the fourth area Ad2, and the eighth touch electrode TE is disposed in one of the (n/k)−3 touch electrode rows TER other than the (j−1)-th touch electrode row TER, the j-th touch electrode row TER, and the (j+1)-th touch electrode row TER out of the n/k touch electrode rows TER included in the fourth area Ad2.

Referring to the third touch sensor structure illustrated in FIG. 5, the number of touch lines TL disposed in the touch panel TSP is (m×n)/2. In the third touch sensor structure illustrated in FIG. 5, the number of touch electrodes TE (Nc) connected to one touch line TL is 2. Accordingly, the number of touch channels which has to be provided in the touch driving circuit TDC corresponds to (m×n)/2.

Referring to FIG. 5, the separation distance between the third touch electrode TE and the fourth touch electrode TE is greater than the length in the column direction of each of the plurality of touch electrodes TE.

Referring to FIG. 5, the third area Au2 is located between the first area Au1 and the second area Ad1, and the second area Ad1 is located between the third area Au2 and the fourth area Ad2.

In this case, a touch driving circuit TDC that is electrically connected to the first touch line TL, the second touch line TL, the third touch line TL, and the fourth touch line TL is further provided.

Referring to FIG. 5, the first touch electrode TE and the third touch electrode TE which are disposed in two areas Au1 and Ad1 which are a first corresponding pair out of four divided areas Au1, Ad1, Au2, and Ad2 are electrically connected to the touch driving circuit TDC via the first touch line TL, and are driven and sensed. The second touch electrode TE and the fourth touch electrode TE are electrically connected to the touch driving circuit TDC via the second touch line TL, and are driven and sensed.

Referring to FIG. 5, the fifth touch electrode TE and the seventh touch electrode TE which are disposed in two areas Au2 and Ad2 which are a second corresponding pair out of four divided areas Au1, Ad1, Au2, and Ad2 are electrically connected to the touch driving circuit TDC via the third touch line TL, and are driven and sensed. The sixth touch electrode TE and the eighth touch electrode TE are electrically connected to the touch driving circuit TDC via the fourth touch line TL, and are driven and sensed.

As will be described later, the touch driving circuit TDC acquires a sensing value via the first touch line TL which is electrically connected to the first touch electrode TE and the third touch electrode TE which are disposed in two areas Au1 and Ad1 which is the first corresponding pair out of four divided areas Au1, Ad1, Au2, and Ad2, and acquires a sensing value via the second touch line TL which is electrically connected to the second touch electrode TE and the fourth touch electrode TE.

The touch driving circuit TDC acquires a sensing value via the third touch line TL which is electrically connected to the fifth touch electrode TE and the seventh touch electrode TE which are disposed in two areas Au2 and Ad2 which is the second corresponding pair out of four divided areas Au1, Ad1, Au2, and Ad2, and acquires a sensing value via the fourth touch line TL which is electrically connected to the sixth touch electrode TE and the eighth touch electrode TE.

The touch driving circuit TDC outputs sensing data including the sensing values which are acquired as described above.

When a touch has occurred in the first area Au1 out of the two areas Au1 and Ad1 which is the first corresponding pair out of four divided areas Au1, Ad1, Au2, and Ad2 in the touch sensing area TSA, the positions of the touch electrodes TE of which the sensing value is equal to or greater than a threshold value in the first area Au1 are gathered and the positions of the touch electrodes TE of which the sensing value is equal to or greater than a threshold value in the second area Ad1 are dispersed.

When a touch has occurred in the third area Au2 out of the two areas Au2 and Ad2 which are the second corresponding pair out of four divided areas Au1, Ad1, Au2, and Ad2 in the touch sensing area TSA, the positions of the touch electrodes TE of which the sensing value is equal to or greater than a threshold value in the third area Au2 are gathered and the positions of the touch electrodes TE of which the sensing value is equal to or greater than a threshold value in the fourth area Ad2 are dispersed.

FIG. 6 is a diagram illustrating a table of examples of the touch sensor structure in the touch panel TSP of the touch display device according to embodiments of the present disclosure.

Referring to FIG. 6, the number of divided areas k, the number of connected touch electrodes Nc, and a touch channel reduction effect for the reference touch sensor structure, the first touch sensor structure (Case 1), the second touch sensor structure (Case 2), and the third touch sensor structure (Case 3) can be arranged as follows.

In the reference touch sensor structure Reference, the number of divided areas k is 1, the number of connected touch electrodes Nc is 1, and the number of touch channels is m×n.

In the first touch sensor structure Case 1, the number of divided areas k is 2, the number of connected touch electrodes Nc is 2, and the number of touch channels is (m×n)/2. The number of touch channels is reduced to ½ from that of the reference touch sensor structure Reference.

In the second touch sensor structure Case 2, the number of divided areas k is 3, the number of connected touch electrodes Nc is 3, and the number of touch channels is (m×n)/3. The number of touch channels is reduced to ⅓ from that of the reference touch sensor structure Reference.

In the third touch sensor structure Case 3, the number of divided areas k is 4, the number of connected touch electrodes Nc is 2, and the number of touch channels is (m×n)/2. The number of touch channels is reduced to ½ from that of the reference touch sensor structure Reference.

Figure 7:
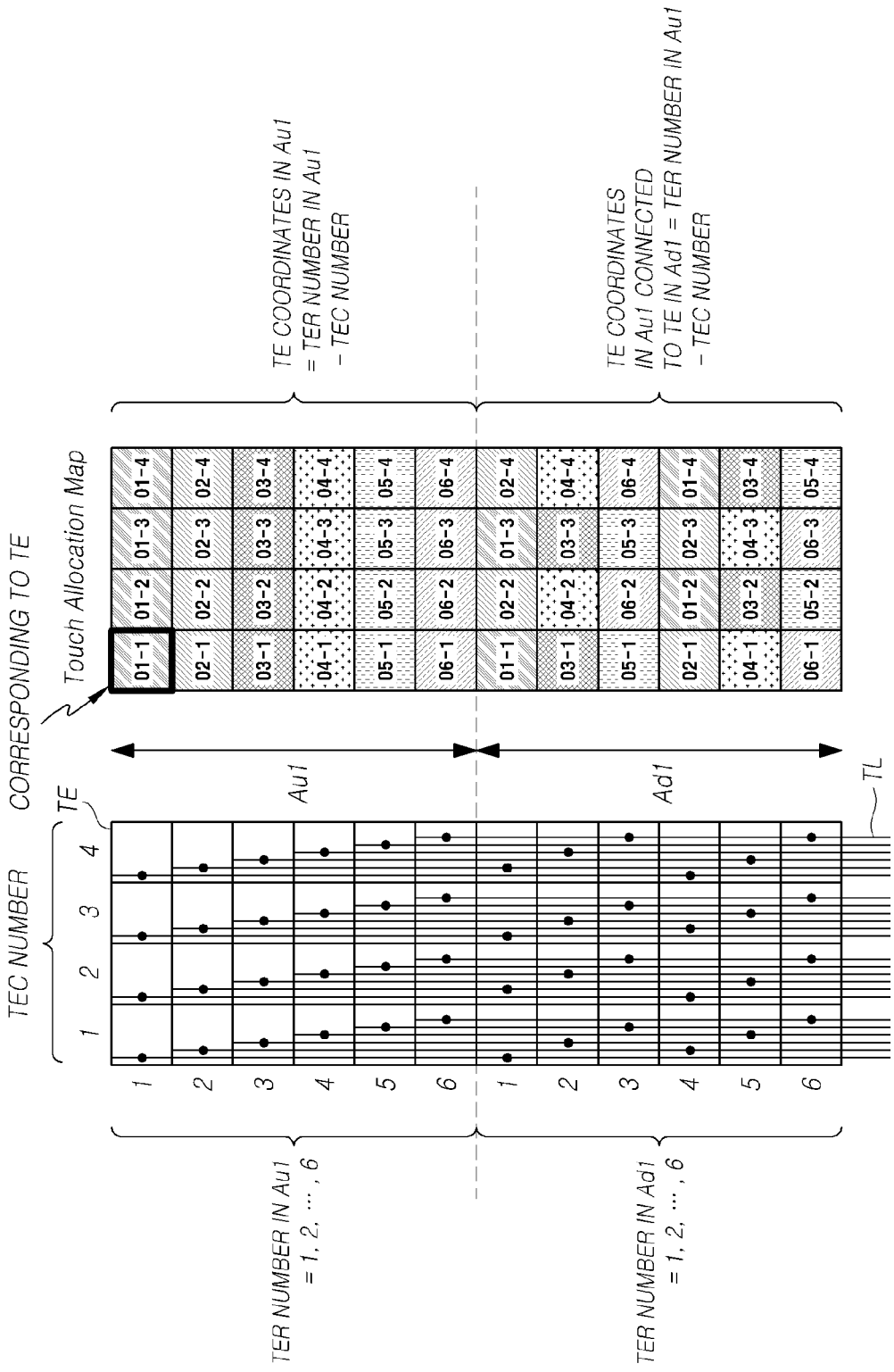
FIG. 7 is a diagram illustrating a first touch sensor structure and a touch allocation map in the touch panel of the touch display device according to the embodiments of the present disclosure.

FIG. 7 is a diagram illustrating a first touch sensor structure and a touch allocation map in the touch panel TSP of the touch display device according to the embodiments of the present disclosure.

FIG. 7 illustrates a first touch sensor structure (k=2) and a touch electrode connection structure (Nc=2) for the touch panel TSP with n=12 and m=4 and illustrates the touch allocation map indicating a touch electrode connection structure between 24 touch electrodes TE in the first area Au1 and 24 touch electrodes TE in the second area Ad1 on the basis of the first touch sensor structure the touch electrode connection structure.

In the example illustrated in FIG. 7, a total of 48 touch electrodes TE are arranged in the touch panel TSP. The total of 48 touch electrodes TE arranged in the touch panel TSP include 24 touch electrodes TE in the first area Au1 and 24 touch electrodes TE in the second area Ad1. One of the 24 touch electrodes TE in the first area Au1 and one of the 24 touch electrodes TE in the second area Ad1 form one connection set and are electrically connected to each other via one touch line TL.

Referring to FIG. 7, each of the first area Au1 and the second area Ad1 into which the touch panel TSP is divided includes six touch electrode rows TER. The first area Au1 and the second area Ad1 include the same four touch electrode columns TEC.

In the first touch sensor structure and the touch electrode connection structure illustrated in FIG. 7, 24 ((m×n)/2=4× 12/2=24) touch lines TL are arranged in the touch panel TSP. The number of touch lines and the number of touch channels can be reduced to ½.

One of the 24 touch electrodes TE in the first area Au1 and one of the 24 touch electrodes TE in the second area Ad1 form one connection set and are electrically connected to each other via one touch line TL. The touch electrode connection structure between the 24 touch electrodes TE in the first area Au1 and the 24 touch electrodes TE in the second area Ad1 are represented by the touch allocation map.

The touch driving circuit TDC or the touch controller TCTR may store the touch allocation map as data in advance.

In the touch allocation map illustrated in FIG. 7, one rectangular box corresponds to one touch electrode TE. Text ("numeral-numeral") in one rectangular box indicates touch electrode coordinates.

In the touch allocation map illustrated in FIG. 7, each of 24 rectangular boxes corresponding to 24 touch electrodes TE in the first area Au1 includes coordinates ("numeral-numeral") of the corresponding touch electrode TE in the first area Au.

The coordinates ("numeral-numeral") of a touch electrode TE in the first area Au1 can be expressed in the form of "a touch electrode row number of the touch electrode TE in the first area Au1"—"a touch electrode column number of the touch electrode in the first area Au1."

For example, the coordinates of a touch electrode TE of the first row and the first column in the first area Au1 are 01-1. The coordinates of a touch electrode TE of the first row and the second column in the first area Au1 are 01-2. The coordinates of a touch electrode TE of the second row and the first column in the first area Au1 are 02-1. The coordinates of a touch electrode TE of the third row and the fourth column in the first area Au1 are 03-4.

In the touch allocation map illustrated in FIG. 7, each of 24 rectangular boxes corresponding to 24 touch electrodes TE in the second area Ad1 includes coordinates ("numeral-numeral") of the corresponding touch electrode TE in the first area Au1 connected to the corresponding touch electrode TE in the second area Ad1.

For example, the coordinates corresponding to a touch electrode TE of the first row and the first column in the second area Ad1 are 01-1 which is the coordinates of the touch electrode TE in the first area Au1 connected to the touch electrode TE of the first row and the first column in the second area Ad1. The coordinates corresponding to a touch electrode TE of the first row and the second column in the second area Ad1 are 02-2 which is the coordinates of the touch electrode TE in the first area Au1 connected to the touch electrode TE of the first row and the second column in the second area Ad1. The coordinates corresponding to a touch electrode TE of the second row and the first column in the second area Ad1 are 03-1 which is the coordinates of the touch electrode TE in the first area Au1 connected to the touch electrode TE of the second row and the first column in the second area Ad1. The coordinates corresponding to a touch electrode TE of the third row and the fourth column in the second area Ad1 are 06-4 which is the coordinates of the touch electrode TE in the first area Au1 connected to the touch electrode TE of the third row and the fourth column in the second area Ad1. The coordinates corresponding to a touch electrode TE of the fifth row and the second column in the second area Ad1 are 03-2 which is the coordinates of the touch electrode TE in the first area Au1 connected to the touch electrode TE of the fifth row and the second column in the second area Ad1.

Referring to FIG. 7, according to the rule of the touch electrode connection structure described above, when the coordinates of 24 touch electrodes TE disposed in the first area Au1 are sequentially expressed using rows and columns, the positions of the 24 touch electrodes TE in the second area Ad1 connected to the 24 touch electrodes TE disposed in the first area Au1 are scattered.

On the other hand, according to the rule of the touch electrode connection structure described above, when the coordinates of 24 touch electrodes TE disposed in the second area Ad1 are sequentially expressed using rows and columns, the positions of the 24 touch electrodes TE in the first area Au1 connected to the 24 touch electrodes TE disposed in the second area Ad1 are scattered.

Figure 8:
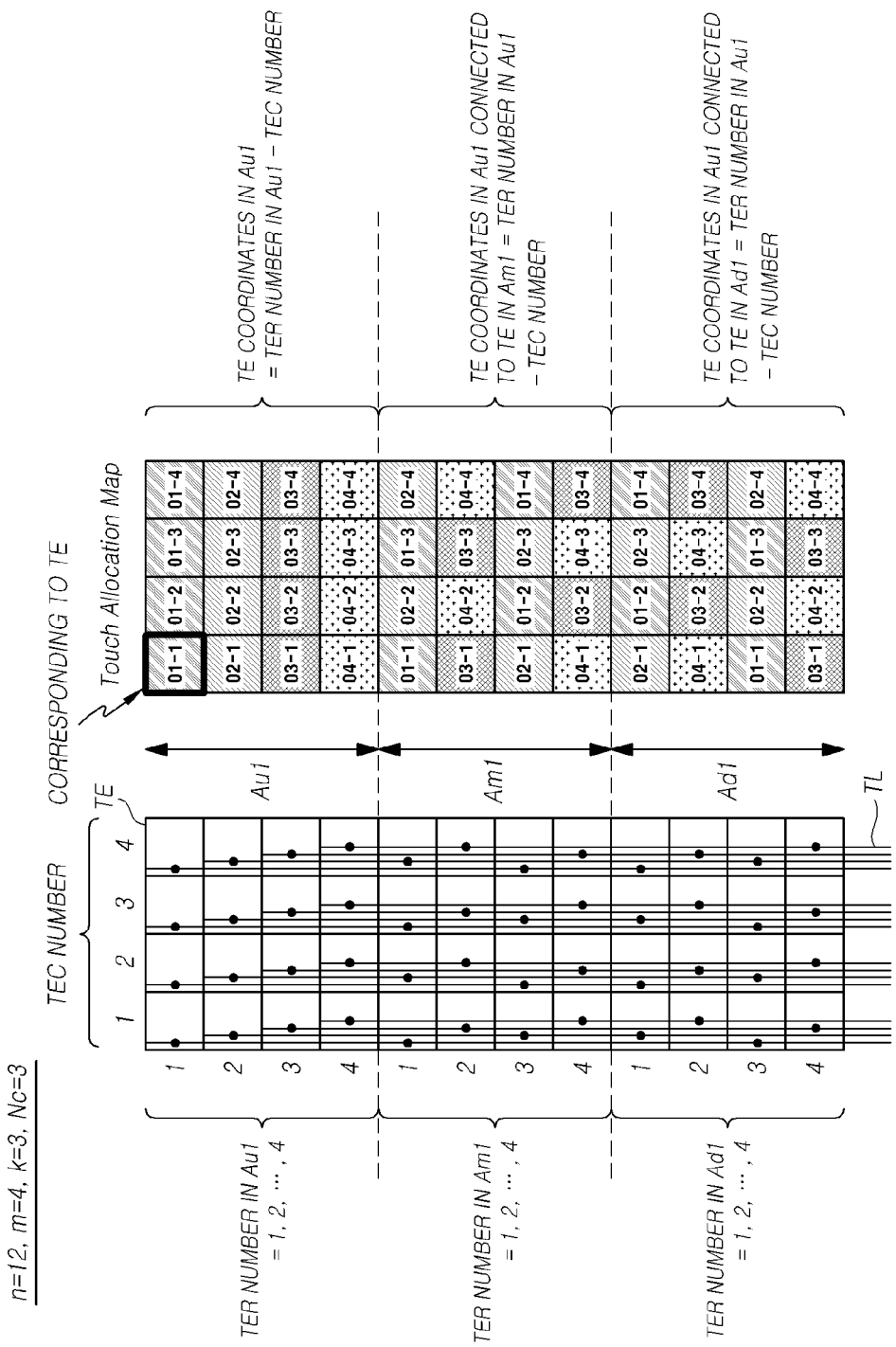
FIG. 8 is a diagram illustrating a second touch sensor structure and a touch allocation map in the touch panel of the touch display device according to the embodiments of the present disclosure.

FIG. 8 is a diagram illustrating a second touch sensor structure and a touch allocation map in the touch panel TSP of the touch display device according to the embodiments of the present disclosure.

FIG. 8 illustrates a second touch sensor structure (k=3) and a touch electrode connection structure (Nc=3) for the touch panel TSP with n=12 and m=4 and illustrates the touch allocation map indicating a touch electrode connection structure between 16 touch electrodes TE in the first area Au1, 16 touch electrodes TE in the second area Ad1, and 16 touch electrodes TE in the third area Am1 on the basis of the second touch sensor structure the touch electrode connection structure.

In the example illustrated in FIG. 8, a total of 48 touch electrodes TE are arranged in the touch panel TSP. The total of 48 touch electrodes TE arranged in the touch panel TSP include 16 touch electrodes TE in the first area Au1, 16 touch electrodes TE in the second area Ad1, and 16 touch electrodes TE in the third area Am1. One of the 16 touch electrodes TE in the first area Au1, one of the 16 touch electrodes TE in the second area Ad1, and one of the 16 touch electrodes TE in the third area Am1 form one connection set and are electrically connected to each other via one touch line TL.

Referring to FIG. 8, each of the first area Au1, the second area Ad1, and the third area Am1 into which the touch panel TSP is divided includes four touch electrode rows TER. The first area Au1, the second area Ad1, and the third area Am1 include the same four touch electrode columns TEC.

In the second touch sensor structure and the touch electrode connection structure illustrated in FIG. 8, 16 ((m×n)/3=4×12/3=16) touch lines TL are arranged in the touch panel TSP. The number of touch lines and the number of touch channels can be reduced to ⅓.

One of the 16 touch electrodes TE in the first area Au1, one of the 24 touch electrodes TE, and one of the 16 touch electrodes TE in the second area Ad1 and one of the 16 touch electrodes TE in the third area Am1 form one connection set and are electrically connected to each other via one touch line TL. The touch electrode connection structure between the 16 touch electrodes TE in the first area Au1, the 16 touch electrodes TE in the second area Ad1, and the 16 touch electrodes TE in the third area Am1 are represented by the touch allocation map.

The touch driving circuit TDC or the touch controller TCTR may store the touch allocation map as data in advance.

In the touch allocation map illustrated in FIG. 8, one rectangular box corresponds to one touch electrode TE. Text ("numeral-numeral") in one rectangular box indicates touch electrode coordinates.

In the touch allocation map illustrated in FIG. 8, each of 16 rectangular boxes corresponding to 16 touch electrodes TE in the first area Au1 includes coordinates ("numeral-numeral") of the corresponding touch electrode TE in the first area Au.

The coordinates ("numeral-numeral") of a touch electrode TE in the first area Au1 can be expressed in the form of "a touch electrode row number of the touch electrode TE in the first area Au1"—"a touch electrode column number of the touch electrode in the first area Au1."

For example, the coordinates of a touch electrode TE of the first row and the first column in the first area Au1 are 01-1. The coordinates of a touch electrode TE of the first row and the second column in the first area Au1 are 01-2. The coordinates of a touch electrode TE of the second row and the first column in the first area Au1 are 02-1. The coordinates of a touch electrode TE of the third row and the fourth column in the first area Au1 are 03-4.

In the touch allocation map illustrated in FIG. 8, each of 16 rectangular boxes corresponding to 16 touch electrodes TE in the second area Ad1 includes coordinates ("numeral-numeral") of the corresponding touch electrode TE in the first area Au1 connected to the corresponding touch electrode TE in the second area Ad1.

For example, the coordinates corresponding to a touch electrode TE of the first row and the first column in the second area Ad1 are 02-1 which is the coordinates of the touch electrode TE in the first area Au1 connected to the touch electrode TE of the first row and the first column in the second area Ad1. The coordinates corresponding to a touch electrode TE of the first row and the second column in the second area Ad1 are 01-2 which is the coordinates of the touch electrode TE in the first area Au1 connected to the touch electrode TE of the first row and the second column in the second area Ad1. The coordinates corresponding to a touch electrode TE of the second row and the first column in the second area Ad1 are 04-1 which is the coordinates of the touch electrode TE in the first area Au1 connected to the touch electrode TE of the second row and the first column in the second area Ad1. The coordinates corresponding to a touch electrode TE of the third row and the fourth column in the second area Ad1 are 02-4 which is the coordinates of the touch electrode TE in the first area Au1 connected to the touch electrode TE of the third row and the fourth column in the second area Ad1.

In the touch allocation map illustrated in FIG. 8, each of 16 rectangular boxes corresponding to 16 touch electrodes TE in the third area Am1 includes coordinates ("numeral-numeral") of the corresponding touch electrode TE in the first area Au1 connected to the corresponding touch electrode TE in the third area Am1.

For example, the coordinates corresponding to a touch electrode TE of the first row and the first column in the third area Am1 are 01-1 which is the coordinates of the touch electrode TE in the first area Au1 connected to the touch electrode TE of the first row and the first column in the third area Am1. The coordinates corresponding to a touch electrode TE of the first row and the second column in the third area Am1 are 02-2 which is the coordinates of the touch electrode TE in the first area Au1 connected to the touch electrode TE of the first row and the second column in the third area Am1. The coordinates corresponding to a touch electrode TE of the second row and the first column in the third area Am1 are 03-1 which is the coordinates of the touch electrode TE in the first area Au1 connected to the touch electrode TE of the second row and the first column in the third area Am1. The coordinates corresponding to a touch electrode TE of the third row and the fourth column in the third area Am1 are 01-4 which is the coordinates of the touch electrode TE in the first area Au1 connected to the touch electrode TE of the third row and the fourth column in the third area Am1.

Referring to FIG. 8, according to the rule of the touch electrode connection structure described above, when the coordinates of 16 touch electrodes TE disposed in the first area Au1 are sequentially expressed using rows and columns, the positions of the 16 touch electrodes TE in the second area Ad1 connected to the 16 touch electrodes TE disposed in the first area Au1 are scattered and the positions of the 16 touch electrodes TE in the third area Am1 connected to the 16 touch electrodes TE disposed in the first area Au1 are scattered.

In addition, according to the rule of the touch electrode connection structure described above, when the coordinates of 16 touch electrodes TE disposed in the second area Ad1 are sequentially expressed using rows and columns, the positions of the 16 touch electrodes TE in the first area Au1 connected to the 16 touch electrodes TE disposed in the second area Ad1 are scattered and the positions of the 16 touch electrodes TE in the third area Am1 connected to the 16 touch electrodes TE disposed in the second area Ad1 are scattered.

According to the rule of the touch electrode connection structure described above, when the coordinates of 16 touch electrodes TE disposed in the third area Am1 are sequentially expressed using rows and columns, the positions of the 16 touch electrodes TE in the first area Au1 connected to the 16 touch electrodes TE disposed in the third area Am1 are scattered and the positions of the 16 touch electrodes TE in the second area Ad1 connected to the 16 touch electrodes TE disposed in the third area Am1 are scattered.

Figure 9:
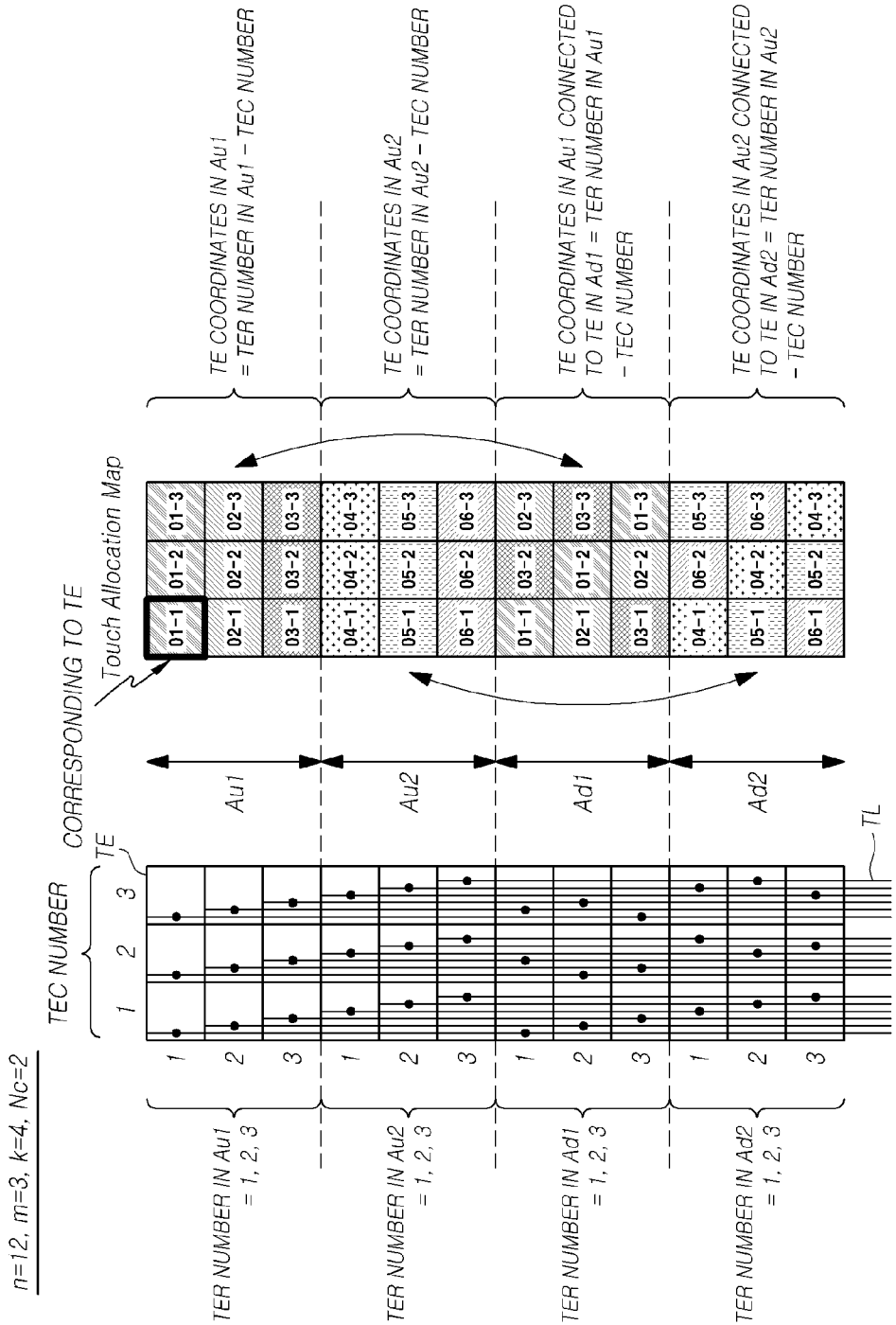
FIG. 9 is a diagram illustrating a third touch sensor structure and a touch allocation map in the touch panel of the touch display device according to the embodiments of the present disclosure.

FIG. 9 is a diagram illustrating a third touch sensor structure and a touch allocation map in the touch panel TSP of the touch display device according to the embodiments of the present disclosure.

FIG. 9 illustrates a third touch sensor structure (k=4) and a touch electrode connection structure (Nc=2) for the touch panel TSP with n=12 and m=3 and illustrates the touch allocation map indicating a touch electrode connection structure between 9 touch electrodes TE in the first area Au1 and 9 touch electrodes TE in the second area Ad1 and a touch electrode connection structure between 9 touch electrodes TE in the third area Au2 and 9 touch electrodes TE in the fourth area Ad2 on the basis of the third touch sensor structure the touch electrode connection structure.

In the example illustrated in FIG. 9, a total of 36 touch electrodes TE are arranged in the touch panel TSP. The total of 36 touch electrodes TE arranged in the touch panel TSP include 9 touch electrodes TE in the first area Au1, 9 touch electrodes TE in the second area Ad1, 9 touch electrodes TE in the third area Au2, 9 touch electrodes TE in the fourth area Ad2.

One of the 9 touch electrodes TE in the first area Au1 and one of the 9 touch electrodes TE in the second area Ad1 form one connection set and are electrically connected to each other via one touch line TL. One of the 9 touch electrodes TE in the third area Au2 and one of the 9 touch electrodes TE in the fourth area Ad2 form one connection set and are electrically connected to each other via one touch line TL.

Referring to FIG. 9, each of the first area Au1, the second area Ad1, the third area Au2, and the fourth area Ad2 into which the touch panel TSP is divided includes three touch electrode rows TER. The first area Au1, the second area Ad1, the third area Au2, and the fourth area Ad2 include the same three touch electrode columns TEC.

In the third touch sensor structure and the touch electrode connection structure illustrated in FIG. 9, 18 ((m×n)/2=3×12/2=18) touch lines TL are arranged in the touch panel TSP. The number of touch lines and the number of touch channels can be reduced to ½.

One of the 9 touch electrodes TE in the first area Au1 and one of the 9 touch electrodes TE in the second area Ad1 form one connection set and are electrically connected to each other via one touch line TL. One of the 9 touch electrodes TE in the third area Au2 and one of the 9 touch electrodes TE in the fourth area Ad2 form one connection set and are electrically connected to each other via one touch line TL.

The touch electrode connection structure between the 9 touch electrodes TE in the first area Au1 and the 9 touch electrodes TE in the second area Ad1 and the touch electrode connection structure between the 9 touch electrodes TE in the third area Au2 and the 9 touch electrodes TE in the fourth area Ad2 are represented by the touch allocation map.

The touch driving circuit TDC or the touch controller TCTR may store the touch allocation map as data in advance.

In the touch allocation map illustrated in FIG. 9, one rectangular box corresponds to one touch electrode TE. Text ("numeral-numeral") in one rectangular box indicates touch electrode coordinates. The methods of generating and setting the touch allocation map illustrated in FIG. 9 are the same as illustrated in FIGS. 7 and 8.

Referring to FIG. 9, according to the rule of the touch electrode connection structure described above, when the coordinates of 9 touch electrodes TE disposed in the first area Au1 are sequentially expressed using rows and columns, the positions of the 9 touch electrodes TE in the second area Ad1 connected to the 9 touch electrodes TE disposed in the first area Au1 are scattered.

On the other hand, according to the rule of the touch electrode connection structure described above, when the coordinates of 9 touch electrodes TE disposed in the second area Ad1 are sequentially expressed using rows and columns, the positions of the 9 touch electrodes TE in the first area Au1 connected to the 9 touch electrodes TE disposed in the second area Ad1 are scattered.

Referring to FIG. 9, according to the rule of the touch electrode connection structure described above, when the coordinates of 9 touch electrodes TE disposed in the third area Au2 are sequentially expressed using rows and columns, the positions of the 9 touch electrodes TE in the fourth area Ad2 connected to the 9 touch electrodes TE disposed in the third area Au2 are scattered.

On the other hand, according to the rule of the touch electrode connection structure described above, when the coordinates of 9 touch electrodes TE disposed in the fourth area Ad2 are sequentially expressed using rows and columns, the positions of the 9 touch electrodes TE in the third area Au2 connected to the 9 touch electrodes TE disposed in the fourth area Ad2 are scattered.

Figure 11:
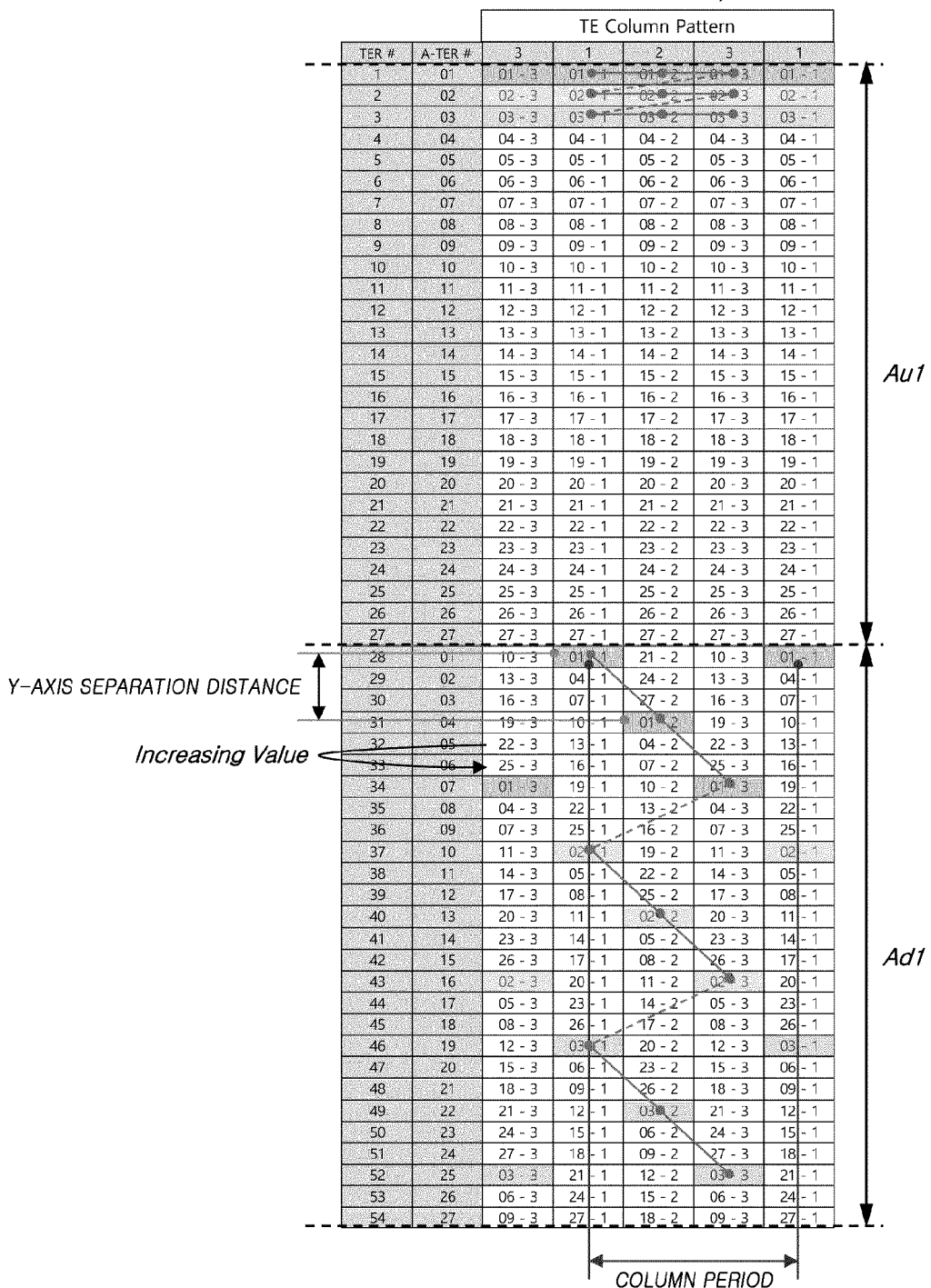
Figure 12:
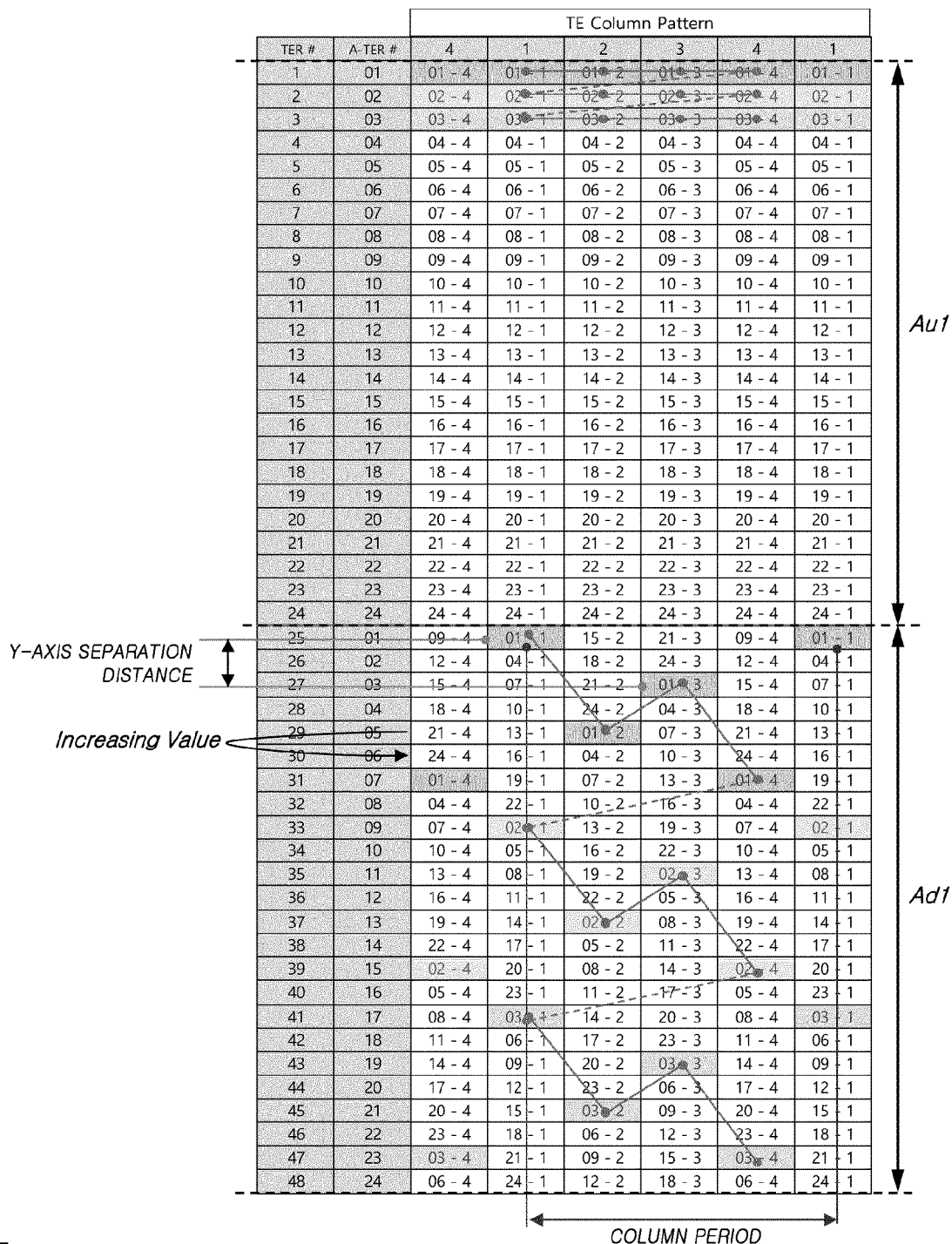

FIGS. 10 to 12 are diagrams illustrating principal factors for the touch electrode connection structure in the touch panel TSP of the touch display device according to the embodiments of the present disclosure.

Referring to FIGS. 10 to 12, factors for adjusting the touch electrode connection structure include 1) a Y-axis separation distance, 2) a column period, and 3) an increasing value.

The touch allocation map illustrated in FIG. 10 is a touch allocation map for the first touch sensor structure in which 36 touch electrode rows TER are partitioned into the first and second areas Au1 and Ad1.

The touch allocation map illustrated in FIG. 10 includes information on numbers (TER #: 1, 2, 3, . . . , 36) of 36 touch electrode rows TER in the whole touch sensing area TSA and information on numbers (A-TER: 01, 02, 03, . . . , 18) of 18 touch electrode rows TER in each of the first and second areas Au1 and Ad1 into which the touch sensing area TSA is divided.

In the example of the touch allocation map illustrated in FIG. 10, the positions of the touch electrodes TE in the second area Ad1 which are electrically connected to the touch electrodes TE disposed in the 18 touch electrode rows TER in the first area Au1 has a zigzag pattern.

Referring to the examples of the touch allocation map illustrated in FIGS. 10 and 11, the touch electrodes TE in the second area Ad1 which are electrically connected to the touch electrodes TE (coordinates: 01-1, 01-2, and 01-3) of the first to third columns disposed in the first touch electrode row TER in the first area Au1 are arranged obliquely to the right-down side, this arrangement is repeated, and a zigzag pattern is repeatedly formed.

In the examples of the touch allocation map illustrated in FIGS. 10 and 11, a repetition period of the position pattern of the touch electrodes TE in the second area Ad1 connected to the touch electrodes TE disposed in the first touch electrode row TER in the first area Au1 corresponds to three touch electrode columns TEC. This repetition period is referred to as a column period.

Referring to the example of the touch allocation map illustrated in FIG. 12, the touch electrodes TE in the second area Ad1 which are electrically connected to the touch electrodes TE (coordinates: 01-1, 01-2, 01-3 and 01-4) of the first to fourth columns disposed in the first touch electrode row TER in the first area Au1 are arranged in a zigzag pattern obliquely to the right-down side, this zigzag pattern is repeated, and a large zigzag pattern is repeatedly formed.

In the example of the touch allocation map illustrated in FIG. 12, a column period which is a repetition period of the position pattern of the touch electrodes TE in the second area Ad1 connected to the touch electrodes TE disposed in the first touch electrode row TER in the first area Au1 corresponds to four touch electrode columns TEC.

As the column period which is one factor for the touch electrode connection structure increases, a degree of dispersion of the sensing values in the second area Ad1 increases, ghost removal performance which will be described later is improved (that is, coordinate separation performance is improved), and it is possible to obtain more accurate touch coordinates.

Referring to the examples of the touch allocation map illustrated in FIGS. 10 to 12, the touch electrodes TE in the second area Ad1 which are electrically connected to the touch electrodes TE (coordinates: 01-1 and 01-2) of the first and second columns disposed in the first touch electrode row TER in the first area Au1 are separated in the column direction. This separation distance is referred to as a Y-axis separation distance.

In the example illustrated in FIG. 10, the Y-axis separation distance is 2. In the example illustrated in FIG. 11, the Y-axis separation distance is 3. In the example illustrated in FIG. 12, the Y-axis separation distance is 2.

As the Y-axis separation distance which is another factor for the touch electrode connection structure increases, the sensing values in the second area Ad1 corresponding to the sensing values which are gathered in position in the first area Au1 are more dispersed in position. In this way, as the degree of dispersion of the sensing values in the second area Ad1 increases, ghost removal performance which will be described later is improved (that is, coordinate separation performance is improved) and it is possible to obtain more accurate touch coordinates.

Referring to the examples of the touch allocation map illustrated in FIGS. 10 to 12, a difference in row between the touch electrodes TE in the first area Au1 which are electrically connected to the touch electrodes TE adjacent to each other in the column direction in the second area Ad1 is referred to as an increasing value.

In the examples illustrated in FIGS. 10 to 12, the increasing value is 3. For example, referring to FIG. 10, the touch electrodes TE in the first area Au1 connected to the touch electrodes TE disposed in the first column of the fifth touch electrode row in the second area Ad1 and the touch electrodes TE disposed in the first column of the sixth touch electrode row are the touch electrode TE (coordinates: 01-3) located in the third column of the first touch electrode row in the first area Au1 and the touch electrode TE (coordinates: 04-3) located in the third column of the fourth touch electrode row in the first area Au1. Accordingly, the increasing value is 3 which corresponds to the difference between the fourth touch electrode row and the first touch electrode row.

As the increasing value which is another factor for the touch electrode connection structure increases, ghost removal performance is improved (that is, coordinate separation performance is improved) and it is possible to obtain more accurate touch coordinates.

FIGS. 13 to 17 are diagrams illustrating touch electrode connection patterns when the touch panel TSP of the touch display device according to the embodiments of the present disclosure has the first to third touch sensor structures.

Figure 13:
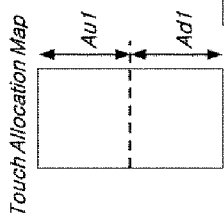
Figure 14:
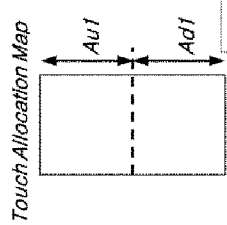
Figure 16:
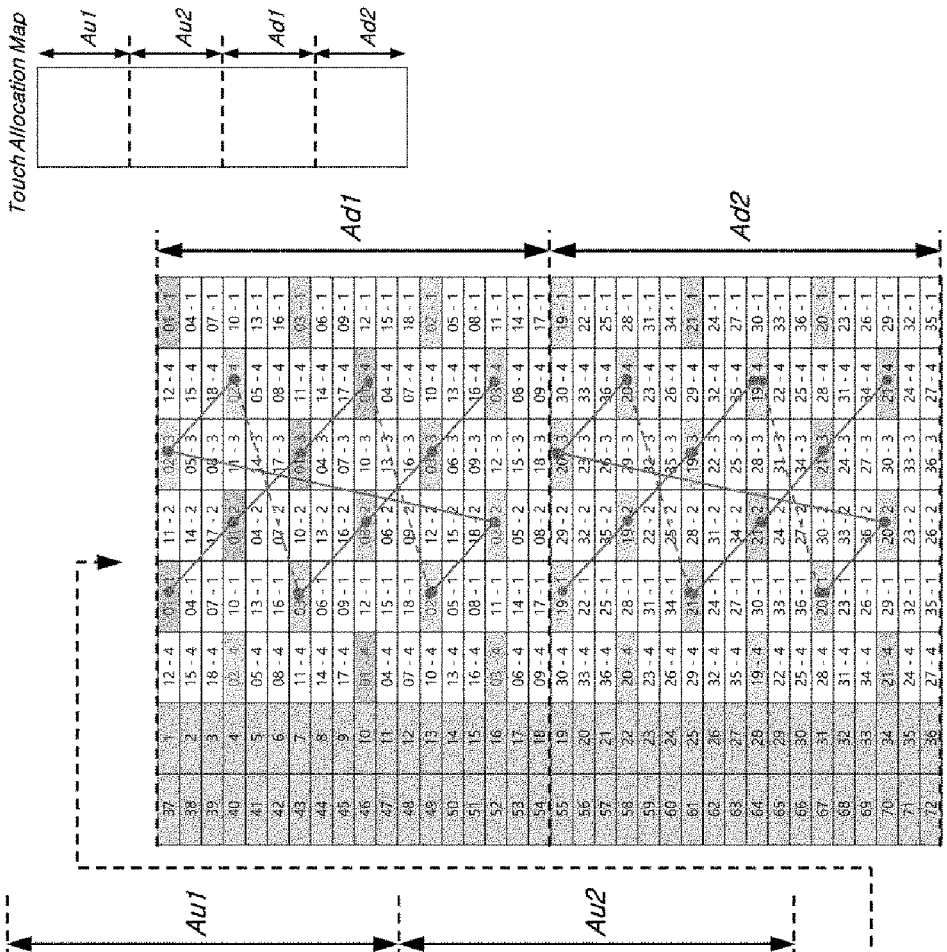
Figure 17:
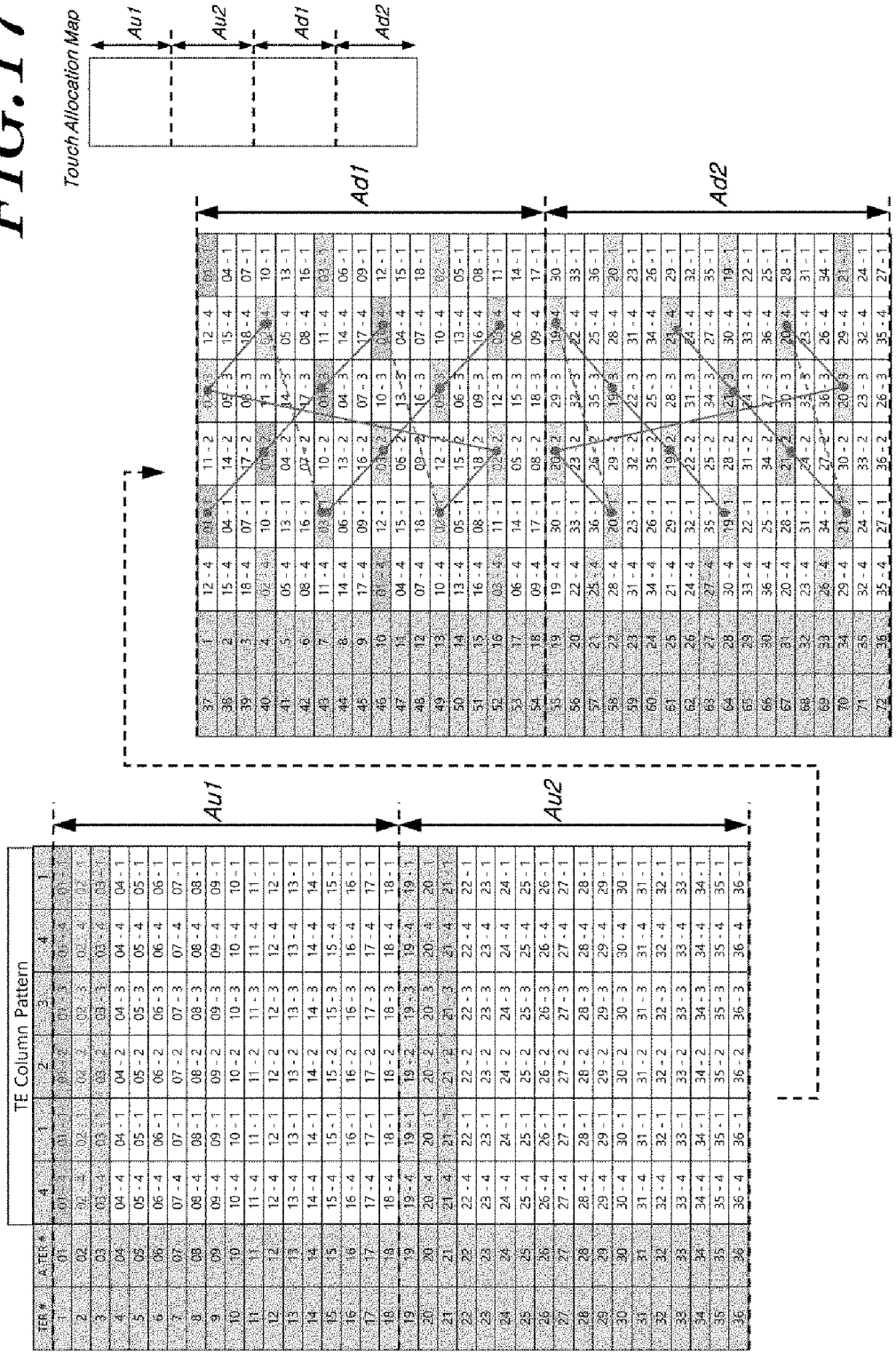

FIGS. 13 and 14 illustrate examples of the touch electrode connection pattern when the touch panel TSP of the touch display device according to embodiments of the present disclosure has the first touch sensor structure. FIG. 15 illustrates an example of the touch electrode connection pattern when the touch panel TSP of the touch display device according to embodiments of the present disclosure has the second touch sensor structure. FIGS. 16 and 17 illustrate examples of the touch electrode connection pattern when the touch panel TSP of the touch display device according to embodiments of the present disclosure has the third touch sensor structure.

Referring to FIGS. 13 to 17, the positions of the touch electrodes TE in the second area Ad1 which are electrically connected to the touch electrodes TE disposed in the first touch electrode row TER out of n/k touch electrode rows TER included in the first area Au1 has a periodic zigzag pattern.

Referring to FIGS. 13 to 17, the pattern of the positions of the touch electrodes TE in the second area Ad1 which are electrically connected to the touch electrodes TE disposed in the second touch electrode row TER other than the first touch electrode row TER out of n/k touch electrode rows TER included in the first area Au1 is the same as the pattern of the positions of the touch electrodes TE in the second area Ad1 which are electrically connected to the touch electrodes TE disposed in the first touch electrode row TER included in the first area Au1.

Alternatively, referring to FIGS. 13 to 17, the pattern of the positions of the touch electrodes TE in the second area Ad1 which are electrically connected to the touch electrodes TE disposed in the second touch electrode row TER other than the first touch electrode row TER out of the n/k touch electrode rows TER included in the first area Au1 may be different from the pattern of the positions of the touch electrodes TE in the second area Ad1 which are electrically connected to the touch electrodes TE disposed in the first touch electrode row TER included in the first area Au1.

Referring to FIG. 13, the pattern of the positions of the touch electrodes TE in the second area Ad1 which are electrically connected to the touch electrodes TE disposed in the first touch electrode row TER included in the first area Au1, the pattern of the positions of the touch electrodes TE in the second area Ad1 which are electrically connected to the touch electrodes TE disposed in the second touch electrode row TER included in the first area Au1, and the pattern of the positions of the touch electrodes TE in the second area Ad1 which are electrically connected to the touch electrodes TE disposed in the third touch electrode row TER included in the first area Au1 are the same as a repeated right-down oblique pattern. In this case, the position pattern of the touch electrodes TE in the second area Ad1 connected to the touch electrodes TE in the first area Au1 is referred to as a stripe pattern.

Referring to FIG. 14, the pattern of the positions of the touch electrodes TE in the second area Ad1 which are electrically connected to the touch electrodes TE disposed in the first touch electrode row TER included in the first area Au1, the pattern of the positions of the touch electrodes TE in the second area Ad1 which are electrically connected to the touch electrodes TE disposed in the second touch electrode row TER included in the first area Au1, and the pattern of the positions of the touch electrodes TE in the second area Ad1 which are electrically connected to the touch electrodes TE disposed in the third touch electrode row TER included in the first area Au1 are the same as a right-down oblique pattern. However, the patterns of the positions of the touch electrodes in the second area Ad1 which are electrically connected to the touch electrodes TE disposed in the fourth touch electrode row TER included in the first area Au1 is different from the repeated right-down oblique pattern and is a pattern which goes up and down greatly in the second area. The pattern illustrated in FIG. 14 is referred to as a zigzag pattern.

Referring to FIG. 15, the pattern of the positions of the touch electrodes TE in the second area Ad1 which are electrically connected to the touch electrodes TE disposed in the first touch electrode row TER included in the first area Au1, the pattern of the positions of the touch electrodes TE in the second area Ad1 which are electrically connected to the touch electrodes TE disposed in the second touch electrode row TER included in the first area Au1, and the pattern of the positions of the touch electrodes TE in the second area Ad1 which are electrically connected to the touch electrodes TE disposed in the third touch electrode row TER included in the first area Au1 are the same as a repeated right-up oblique pattern.

The pattern of the positions of the touch electrodes TE in the third area Am1 which are electrically connected to the touch electrodes TE disposed in the first touch electrode row TER included in the first area Au1, the pattern of the positions of the touch electrodes TE in the third area Am1 which are electrically connected to the touch electrodes TE disposed in the second touch electrode row TER included in the first area Au1, and the pattern of the positions of the touch electrodes TE in the third area Am1 which are electrically connected to the touch electrodes TE disposed in the third touch electrode row TER included in the first area Au1 are the same as a repeated right-down oblique pattern.

Referring to FIG. 15, the pattern in the second area Ad1 and the pattern in the third area Am1 may be horizontally symmetric.

Referring to FIG. 16, the pattern of the positions of the touch electrodes TE in the second area Ad1 which are electrically connected to the touch electrodes TE disposed in the first touch electrode row TER included in the first area Au1 and the pattern of the positions of the touch electrodes TE in the second area Ad1 which are electrically connected to the touch electrodes TE disposed in the third touch electrode row TER included in the first area Au1 are the same as a repeated right-down oblique pattern. The pattern of the positions of the touch electrodes TE in the second area Ad1 which are electrically connected to the touch electrodes TE disposed in the second touch electrode row TER included in the first area Au1 is a pattern which goes up and down greatly in the second area Ad1, unlike the repeated right-down oblique pattern.

Referring to FIG. 16, the pattern of the positions of the touch electrodes TE in the fourth area Ad2 which are electrically connected to the touch electrodes TE disposed in the first touch electrode row TER included in the third area Au2 and the pattern of the positions of the touch electrodes TE in the fourth area Ad2 which are electrically connected to the touch electrodes TE disposed in the third touch electrode row TER included in the third area Au2 are the same as a repeated right-down oblique pattern. The pattern of the positions of the touch electrodes TE in the fourth area Ad2 which are electrically connected to the touch electrodes TE disposed in the second touch electrode row TER included in the third area Au2 is a pattern which goes up and down greatly in the fourth area Ad2, unlike the repeated right-down oblique pattern.

As described above, in the touch electrode connection structure illustrated in FIG. 16, the pattern in the second area Ad1 and pattern in the fourth area Ad2 are the same.

Referring to FIG. 17, the pattern of the positions of the touch electrodes TE in the second area Ad1 which are electrically connected to the touch electrodes TE disposed in the first touch electrode row TER included in the first area Au1 and the pattern of the positions of the touch electrodes TE in the second area Ad1 which are electrically connected to the touch electrodes TE disposed in the third touch electrode row TER included in the first area Au1 are the same as a repeated right-down oblique pattern. The pattern of the positions of the touch electrodes TE in the second area Ad1 which are electrically connected to the touch electrodes TE disposed in the second touch electrode row TER included in the first area Au1 is a pattern which goes up and down greatly in the second area Ad1, unlike the repeated right-down oblique pattern.

Referring to FIG. 17, the pattern of the positions of the touch electrodes TE in the fourth area Ad2 which are electrically connected to the touch electrodes TE disposed in the first touch electrode row TER included in the third area Au2 and the pattern of the positions of the touch electrodes TE in the fourth area Ad2 which are electrically connected to the touch electrodes TE disposed in the third touch electrode row TER included in the third area Au2 are the same as a repeated right-up oblique pattern. The pattern of the positions of the touch electrodes TE in the fourth area Ad2 which are electrically connected to the touch electrodes TE disposed in the second touch electrode row TER included in the third area Au2 is a pattern which goes up and down greatly in the fourth area Ad2, unlike the repeated right-up oblique pattern.

As described above, in the touch electrode connection structure illustrated in FIG. 17, the pattern in the second area Ad1 and the pattern in the fourth area Ad2 are horizontally symmetric. This touch electrode connection structure illustrated in FIG. 17 is referred to as a herringbone structure.

Some details of the above-mentioned touch electrode connection structure will be described below again in brief.

According to the embodiments of the present disclosure, there is provided a touch display device including: a touch panel TSP that includes a plurality of touch electrodes TE and a plurality of touch lines TL which are electrically connected to the plurality of touch electrodes TE; and a touch driving circuit TDC that supplies a touch driving signal to the plurality of touch electrodes TE via the plurality of touch lines TL.

The touch panel TSP includes a touch sensing area TSA including a first area Au1 in which first to fourth touch electrodes TE are disposed and a second area Ad1 or Am1 in which fifth to eighth touch electrodes TE are disposed.

The touch panel TSP includes: a first touch line TL that is electrically connected to the first touch electrode TE and the fifth touch electrode TE via at least one contact hole; a second touch line TL that is electrically connected to the second touch electrode TE and the sixth touch electrode TE via at least one contact hole; a third touch line TL that is electrically connected to the third touch electrode TE and the seventh touch electrode TE via at least one contact hole; and a fourth touch line TL that is electrically connected to the fourth touch electrode TE and the eighth touch electrode TE via at least one contact hole.

The first touch electrode TE is disposed adjacent to the second touch electrode TE and the third touch electrode TE, and the third touch electrode TE is disposed adjacent to the first touch electrode TE and the fourth touch electrode TE.

The fifth touch electrode TE and the sixth touch electrode TE are separated a first separation distance from each other with one or more other touch electrodes interposed therebetween. The fifth touch electrode TE and the seventh touch electrode TE are separated a second separation distance from each other with one or more other touch electrodes interposed therebetween.

The first separation distance and the second separation distance are different from each other.

The seventh touch electrode TE and the eighth touch electrode TE may be separated the first separation distance from each other with one or more other touch electrodes interposed therebetween.

The sixth touch electrode TE and the eighth touch electrode TE may be separated the second separation distance from each other with one or more other touch electrodes interposed therebetween.

The first touch electrode TE and the third touch electrode TE are disposed in the same touch electrode row in the first area Au1, and the second touch electrode TE and the fourth touch electrode TE are disposed in the same touch electrode row in the first area Au.

The fifth touch electrode TE and the seventh touch electrode TE are disposed in different touch electrode rows in the second area Ad1 or Am1. The sixth touch electrode TE and the eighth touch electrode TE are disposed in different touch electrode rows in the second area Ad1 or Am1.

The first touch line TL may overlap the first touch electrode TE, the second touch electrode TE, the fifth touch electrode TE, and the sixth touch electrode TE. The third touch line TL may overlap the third touch electrode TE, the fourth touch electrode TE, the seventh touch electrode TE, and the eighth touch electrode TE. The first touch line TL may not overlap the third touch line TL.

In the touch panel TSP, a distance of the first area Au1 from the touch driving circuit TDC may be greater than a distance of the second area Ad1 or Am1 from the touch driving circuit TDC. Alternatively, in the touch panel TSP, a distance of the first area Au1 from the touch driving circuit TDC may be less than a distance of the second area Ad1 or Am1 from the touch driving circuit TDC.

The first separation distance may be a shortest distance between the fifth touch electrode TE and the sixth touch electrode TE, the second separation distance may be a shortest distance between the fifth touch electrode TE and the seventh touch electrode TE, and the first separation distance may be greater than the second separation distance.

Figure 18:
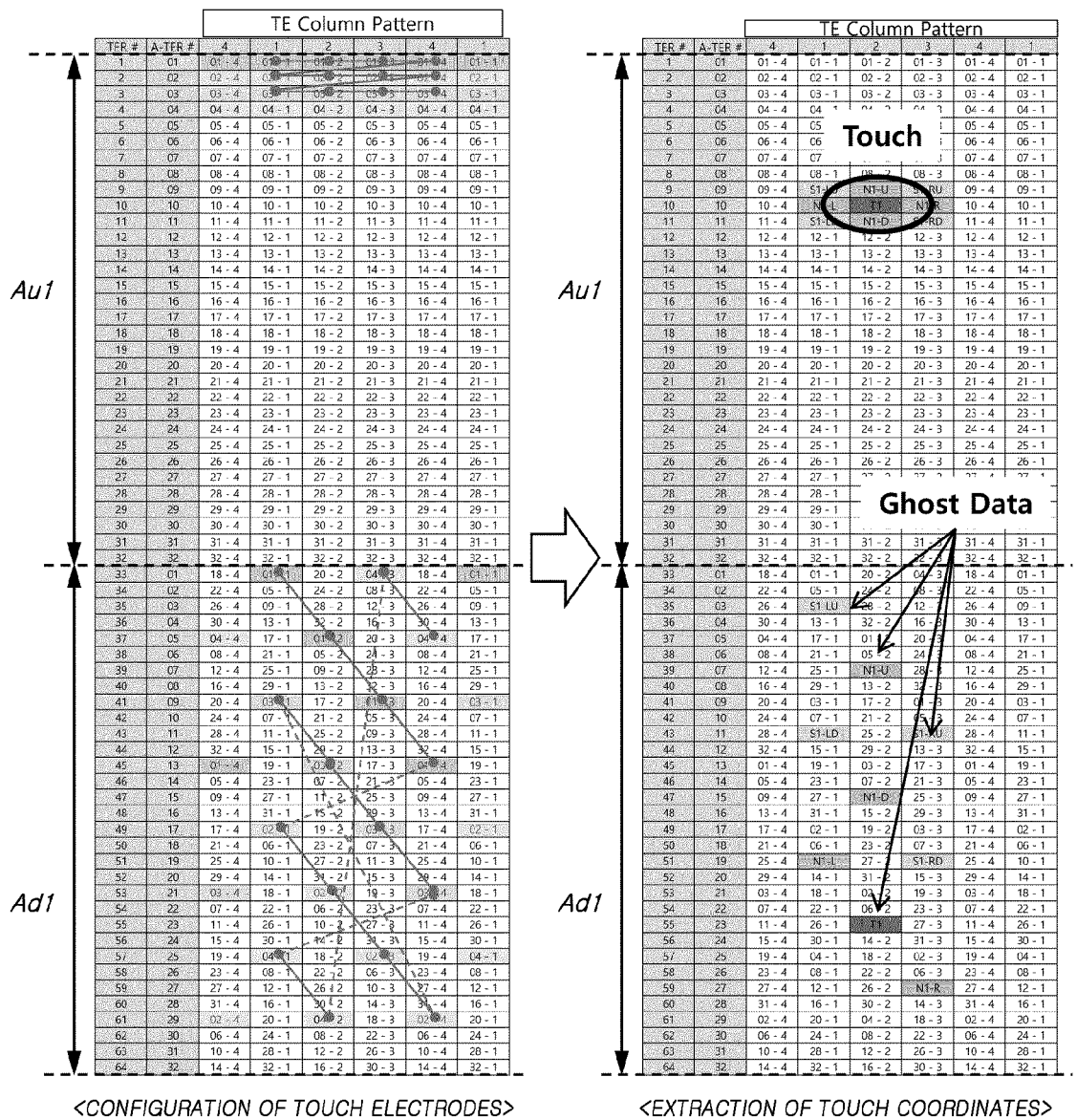
FIG. 18 is a diagram illustrating a method of determining touch coordinates in the touch display device according to the embodiments of the present disclosure.

FIG. 18 is a diagram illustrating a method of determining touch coordinates in the touch display device according to the embodiments of the present disclosure. In the following description, the first touch sensor structure will be described as an example for the purpose of convenience of description. The same is true of the second and third touch sensor structures.

Referring to FIG. 18, the touch driving circuit TDC acquires a sensing value via the first touch line TL which is electrically connected to the first touch electrode TE and the third touch electrode TE, acquires a sensing value via the second touch line TL which is electrically connected to the second touch electrode TE and the fourth touch electrode TE, and outputs sensing data including the acquired sensing values.

When a touch has occurred in the first area Au1 out of two areas Au1 and Ad1 in the touch sensing area TSA, the positions of the touch electrodes TE of which the sensing value is equal to or greater than a threshold value in the first area Au1 are gathered, the positions of the touch electrodes TE of which the sensing value is equal to or greater than a threshold value in the second area Ad1, are dispersed.

Through the use of the sensing data, the touch controller TCTR removes ghost data to prevent determination of erroneous touch coordinates and determines touch coordinates using only normal sensing values.

In other words, the touch controller TCTR removes the sensing values equal to or greater than the threshold value for the touch electrodes TE which are dispersed in the second area Ad1 as ghost data and determines touch coordinates on the basis of the sensing values equal to or greater than the threshold value for the touch electrodes TE which are gathered in the first area Au1.

Figure 19:
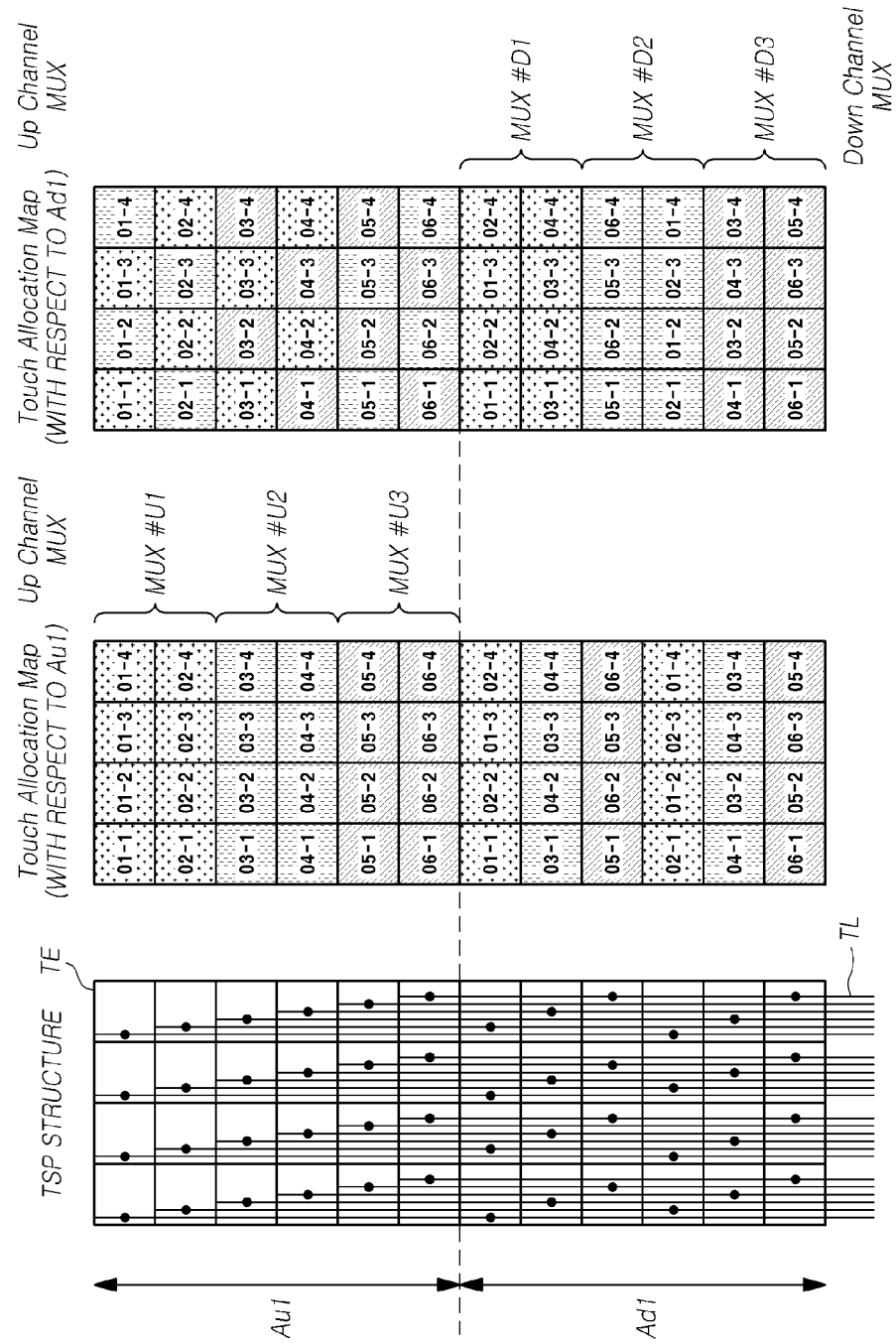
FIG. 19 is a diagram illustrating multiplexing driving for touch sensing in the touch display device according to the embodiments of the present disclosure.
Figure 20:
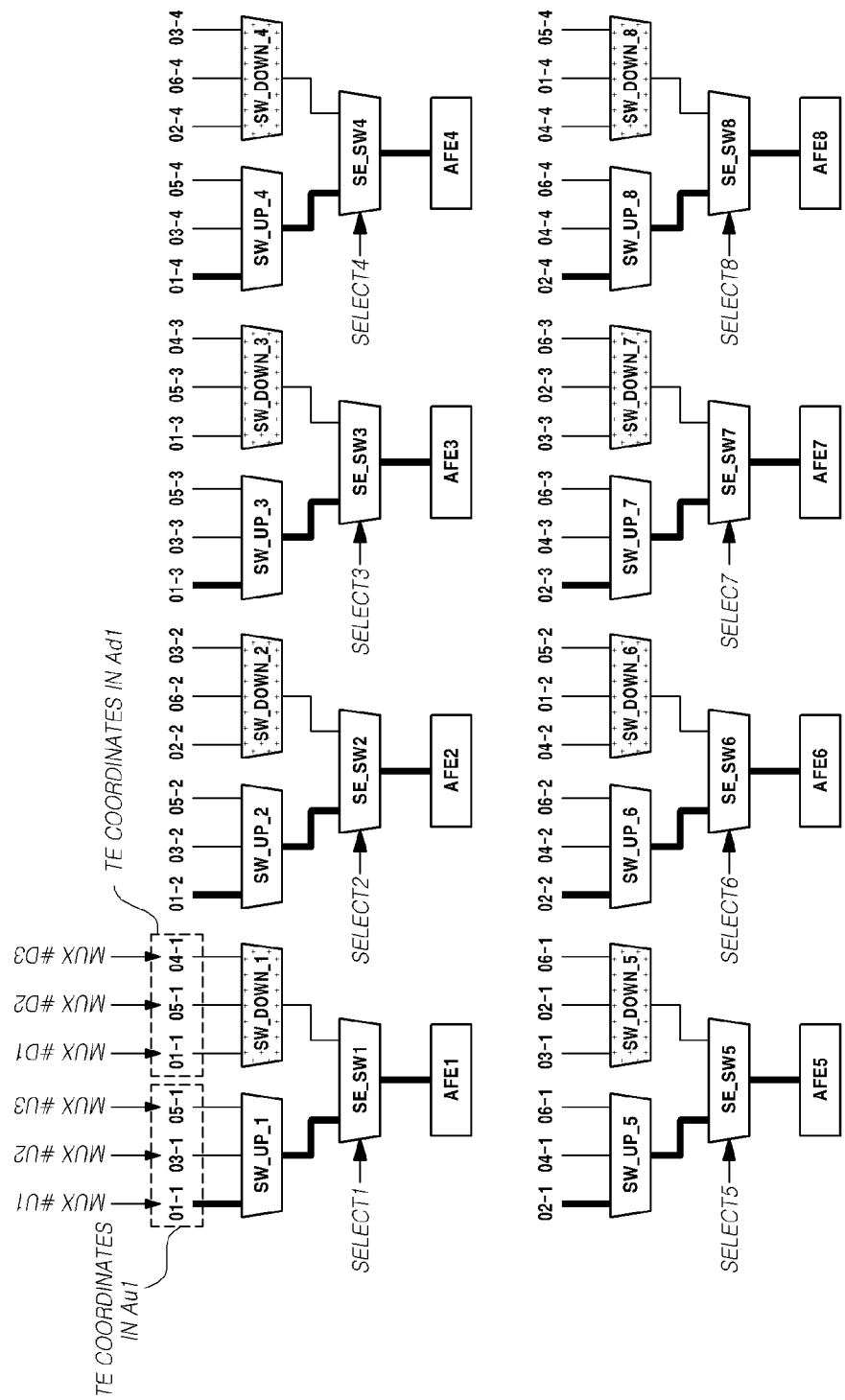
FIG. 20 is a diagram illustrating multiplexer circuits for multiplexing driving in the touch display device according to the embodiments of the present disclosure.

FIG. 19 is a diagram illustrating multiplexing driving for touch sensing in the touch display device according to embodiments of the present disclosure. FIG. 20 is a diagram illustrating multiplexer circuits for multiplexing driving in the touch display device according to embodiments of the present disclosure. The first touch sensor structure will be described below as an example. The same is true of the second and third touch sensor structures.

Referring to FIG. 19, the touch panel TSP has the first touch sensor structure. The touch panel TSP includes 48 touch electrodes TE which are arranged in 12 rows and 4 columns. 24 touch electrodes TE are arranged in 6 rows and 4 columns in the first area Au1, and 24 touch electrodes TE are arranged in 6 rows and 4 columns in the second area Ad1.

Referring to a touch allocation map in FIG. 19 which is generated with respect to the first area Au1 corresponding to an up-channel area, the touch display device designates two touch electrode rows TER out of six touch electrode rows TER in the first area Au1 as one up-channel multiplexing group (Up Channel MUX).

Referring to FIG. 19, the touch electrodes TE disposed in the first and second touch electrode rows TER out of six touch electrode rows TER in the first area Au1 are grouped as a first up-channel multiplexing group MUX #U1 and are simultaneously driven and sensed. The touch electrodes TE disposed in the third and fourth touch electrode rows TER out of six touch electrode rows TER in the first area Au1 are grouped as a second up-channel multiplexing group MUX #U2 and are simultaneously driven and sensed. The touch electrodes TE disposed in the fifth and sixth touch electrode rows TER out of six touch electrode rows TER in the first area Au1 are grouped as a third up-channel multiplexing group MUX #U3 and are simultaneously driven and sensed.

Referring to a touch allocation map in FIG. 19 which is generated with respect to the second area Ad1 corresponding to a down-channel area, the touch display device designates two touch electrode rows TER out of six touch electrode rows TER in the second area Ad1 as one down-channel multiplexing group (Down Channel MUX).

Referring to FIG. 19, the touch electrodes TE disposed in the first and second touch electrode rows TER out of six touch electrode rows TER in the second area Ad1 are grouped as a first down-channel multiplexing group MUX #D1 and are simultaneously driven and sensed. The touch electrodes TE disposed in the third and fourth touch electrode rows TER out of six touch electrode rows TER in the second area Ad1 are grouped as a second down-channel multiplexing group MUX #D2 and are simultaneously driven and sensed. The touch electrodes TE disposed in the fifth and sixth touch electrode rows TER out of six touch electrode rows TER in the second area Ad1 are grouped as a third down-channel multiplexing group MUX #D3 and are simultaneously driven and sensed.

Referring to FIG. 20, the touch driving circuit TDC includes an up-channel multiplexer circuit, a down-channel multiplexer circuit, and a selection switch circuit.

For up-channel multiplexing group driving, that is, for up-multiplexing group driving of the touch electrodes TE disposed in the first area Au1, the up-channel multiplexer circuit includes a plurality of up-channel switches SW_UP_1, SW_UP_2, SW_UP_3, SW_UP_4, SW_UP_5, SW_UP_6, SW_UP_7, and SW_UP_8.

The up-channel multiplexer circuit sequentially drives and senses first to third up-channel multiplexing groups MUX #U1, MUX #U2, and MUX #U3 into which the touch electrodes TE disposed in the first area Au1 are grouped.

When the up-channel multiplexer circuit drives the first up-channel multiplexing group MUX #U1, all the touch electrodes TE included in the first up-channel multiplexing group MUX #U1 are simultaneously driven and sensed. When the up-channel multiplexer circuit drives the second up-channel multiplexing group MUX #U2, all the touch electrodes TE included in the second up-channel multiplexing group MUX #U2 are simultaneously driven and sensed. When the up-channel multiplexer circuit drives the third up-channel multiplexing group MUX #U3, all the touch electrodes TE included in the third up-channel multiplexing group MUX #U3 are simultaneously driven and sensed.

Each of the plurality of up-channel switches SW_UP_1, SW_UP_2, SW_UP_3, SW_UP_4, SW_UP_5, SW_UP_6, SW_UP_7, and SW_UP_8 included in the up-channel multiplexer circuit selects one of one touch electrode TE included in the first up-channel multiplexing group MUX #U1, one touch electrode TE included in the second up-channel multiplexing group MUX #U2, and one touch electrode TE included in the third up-channel multiplexing group MUX #U3.

For example, the first up-channel switch SW_UP_1 selects one of the touch electrode TE with coordinates of 01-1 in the first up-channel multiplexing group MUX #U1, the touch electrode TE with coordinates of 03-1 in the second up-channel multiplexing group MUX #U2, and the touch electrode TE with coordinates of 05-1 in the third up-channel multiplexing group MUX #U3.

For example, the second up-channel switch SW_UP_2 selects one of the touch electrode TE with coordinates of 01-2 in the first up-channel multiplexing group MUX #U1, the touch electrode TE with coordinates of 03-2 in the second up-channel multiplexing group MUX #U2, and the touch electrode TE with coordinates of 05-2 in the third up-channel multiplexing group MUX #U3.

For down-channel multiplexing group driving, that is, for down-multiplexing group driving of the touch electrodes TE disposed in the second area Ad1, the down-channel multiplexer circuit includes a plurality of down-channel switches SW_DOWN_1, SW_DOWN_2, SW_DOWN_3, SW_DOWN_4, SW_DOWN_5, SW_DOWN_6, SW_DOWN_7, and SW_DOWN_8.

The down-channel multiplexer circuit sequentially drives and senses first to third down-channel multiplexing groups MUX #D1, MUX #D2, and MUX #D3 into which the touch electrodes TE disposed in the second area Ad1 are grouped.

When the down-channel multiplexer circuit drives the first down-channel multiplexing group MUX #D1, all the touch electrodes TE included in the first down-channel multiplexing group MUX #D1 are simultaneously driven and sensed. When the down-channel multiplexer circuit drives the second down-channel multiplexing group MUX #D2, all the touch electrodes TE included in the second down-channel multiplexing group MUX #D2 are simultaneously driven and sensed. When the down-channel multiplexer circuit drives the third down-channel multiplexing group MUX #D3, all the touch electrodes TE included in the third down-channel multiplexing group MUX #D3 are simultaneously driven and sensed.

Each of the plurality of down-channel switches SW_DOWN_1, SW_DOWN_2, SW_DOWN_3, SW_DOWN_4, SW_DOWN_5, SW_DOWN_6, SW_DOWN_7, and SW_DOWN_8 included in the down-channel multiplexer circuit selects one of one touch electrode TE included in the first down-channel multiplexing group MUX #D1, one touch electrode TE included in the second down-channel multiplexing group MUX #D2, and one touch electrode TE included in the third down-channel multiplexing group MUX #D3.

For example, the first down-channel switch SW_DOWN_1 selects one of the touch electrode TE with coordinates of 01-1 in the first down-channel multiplexing group MUX #D1, the touch electrode TE with coordinates of 05-1 in the second down-channel multiplexing group MUX #D2, and the touch electrode TE with coordinates of 04-1 in the third down-channel multiplexing group MUX #D3.

For example, the second down-channel switch SW_DOWN_2 selects one of the touch electrode TE with coordinates of 02-2 in the first down-channel multiplexing group MUX #D1, the touch electrode TE with coordinates of 06-2 in the second down-channel multiplexing group MUX #D2, and the touch electrode TE with coordinates of 03-2 in the third down-channel multiplexing group MUX #D3.

The selection switch circuit includes a plurality of selections witches SE_SW1, SE_SW2, SE_SW3, SE_SW4, SE_SW5, SE_SW6, SE_SW7, and SE_SW8.

The selection switch circuit selects one of the up-channel multiplexer circuits and the down-channel multiplexer circuits in response to inputting of selection signals SELECT1 to SELECT8.

Output terminals of the plurality of selection switches SE_SW1, SE_SW2, SE_SW3, SE_SW4, SE_SW5, SE_SW6, SE_SW7, and SE_SW8 included in the selection switch circuit are connected to input terminals of a plurality of analog front end modules AFE1 to AFE8. Here, each of the plurality of analog front end modules AFE1 to AFE8 includes a charge amplifier and may further include an integrator.

At the time of driving and sensing in the first area Au1, the plurality of selection switches SE_SW1, SE_SW2, SE_SW3, SE_SW4, SE_SW5, SE_SW6, SE_SW7, and SE_SW8 included in the selection switch circuit connect the output terminals of the plurality of up-channel switches SW_UP_1, SW_UP_2, SW_UP_3, SW_UP_4, SW_UP_5, SW_UP_6, SW_UP_7, and SW_UP_8 and the input terminals of the plurality of analog front end modules AFE1 to AFE8.

At the time of driving and sensing in the second area Ad1, the plurality of selection switches SE_SW1, SE_SW2, SE_SW3, SE_SW4, SE_SW5, SE_SW6, SE_SW7, and SE_SW8 included in the selection switch circuit connect the output terminals of the plurality of down-channel switches SW_DOWN_1, SW_DOWN_2, SW_DOWN_3, SW_DOWN_4, SW_DOWN_5, SW_DOWN_6, SW_DOWN_7, and SW_DOWN_8 and the input terminals of the plurality of analog front end modules AFE1 to AFE8.

Figure 21:
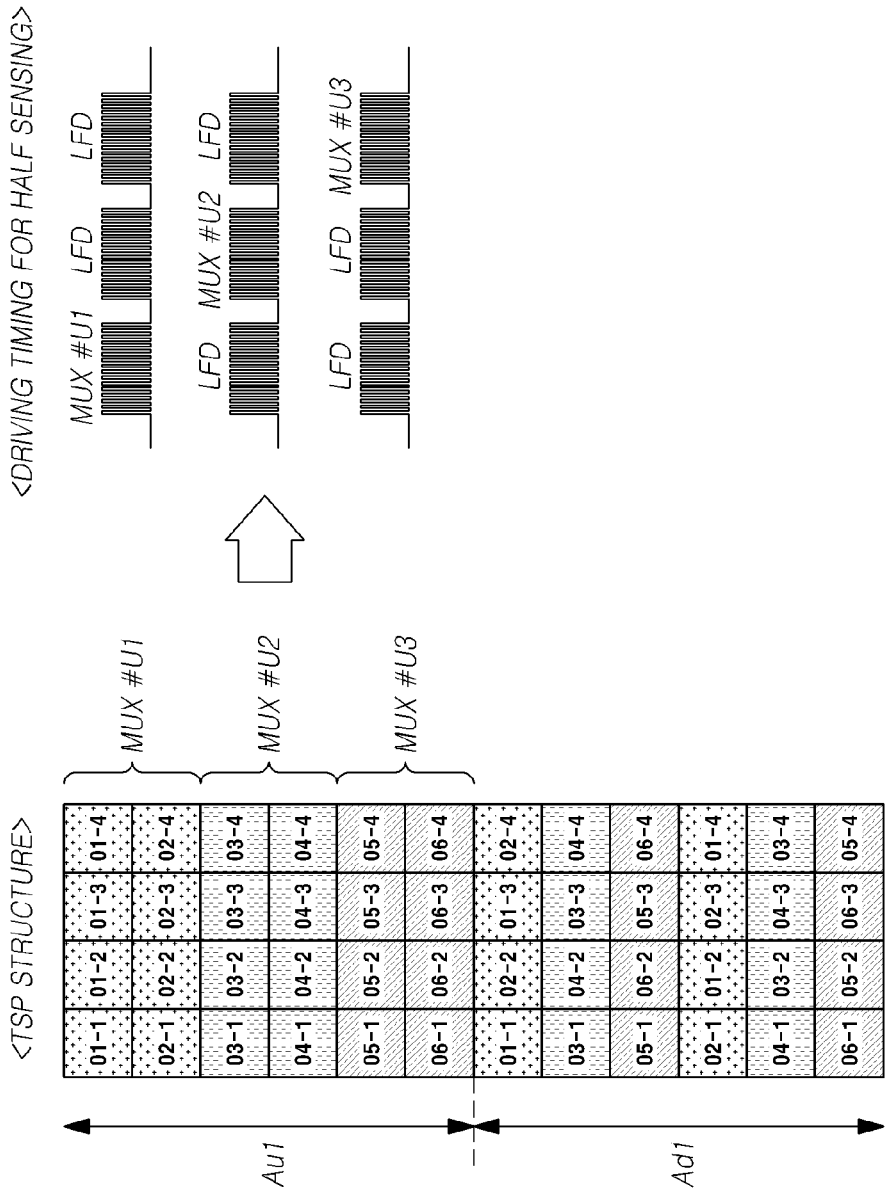
FIGS. 21 and 22 are diagrams illustrating a half-sensing method in the touch display device according to the embodiments of the present disclosure.
Figure 22:
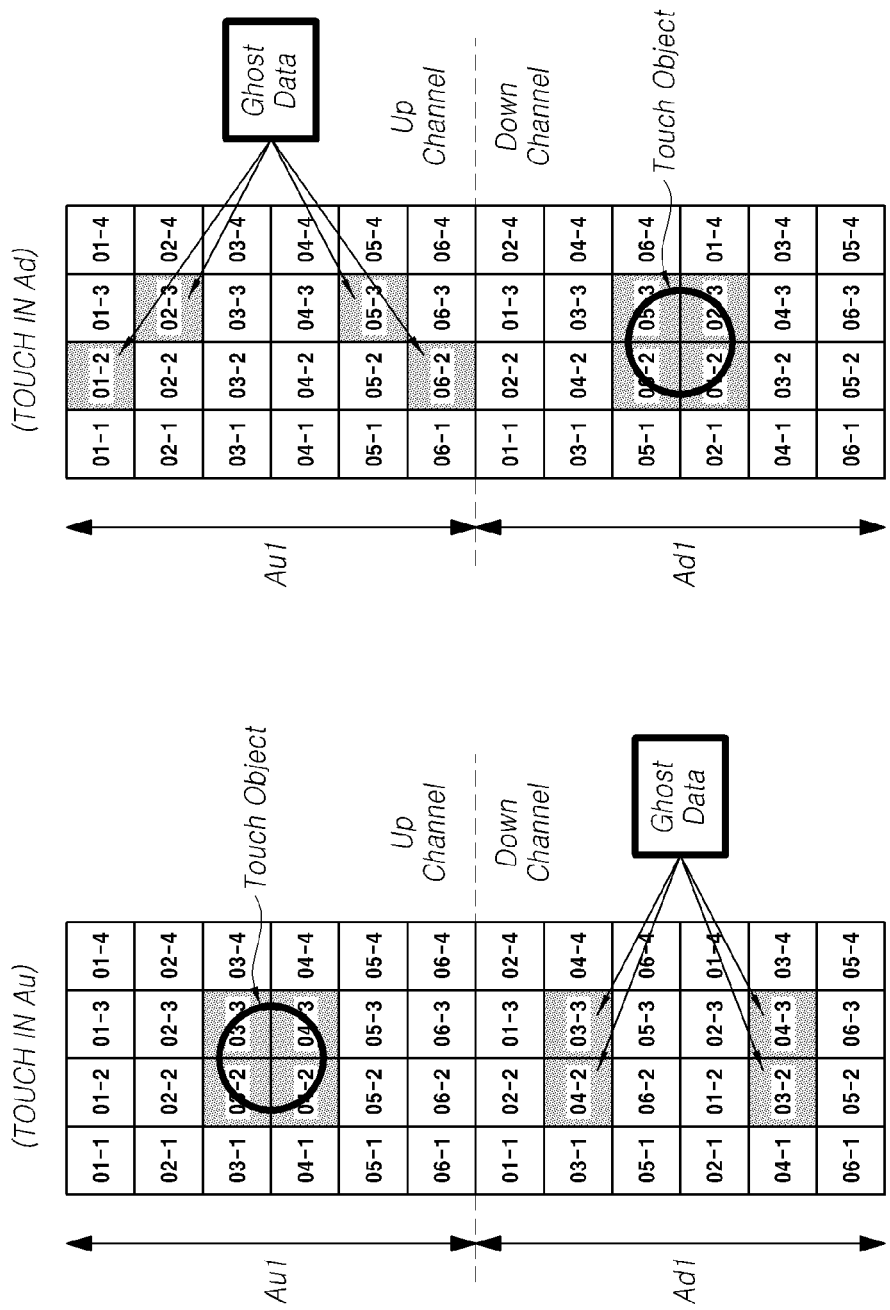

FIGS. 21 and 22 are diagrams illustrating a half-sensing method in the touch display device according to embodiments of the present disclosure.

Referring to FIG. 21, in the first touch sensor structure according to the embodiments of the present disclosure, one touch electrode TE disposed in the first area Au1 and one touch electrode TE disposed in the second area Ad1 are connected to each other via one touch line TL. In other words, a touch line TL connected to one touch electrode disposed in the first area Au1 and a touch line TL connected to one touch electrode TE disposed in the second area Ad1 are electrically connected to each other. That is, an up-channel (a touch line) for the first area Au1 and a down-channel (a touch line) for the second area Ad1 are connected to each other.

The touch driving circuit TDC can perform half-sensing using the above-mentioned touch sensing structure. That is, the touch driving circuit TDC can sense a touch in the entire touch sensing area TSA using sensing data which is acquired by driving and sensing in one of the first area Au1 corresponding to an up-channel area and the second area Ad1 corresponding to a down-channel area.

For example, at the time of touch sensing, the touch driving circuit TDC can acquire sensing data for the second area Ad1 corresponding to a down-channel area even if driving and sensing in only the first area Au1 corresponding to an up-channel area is performed. Accordingly, it is possible to decrease a touch sensing time by a half or more.

Referring to FIG. 21, the touch driving circuit TDC sequentially senses the first up-channel multiplexing group MUX #U1, the second up-channel multiplexing group MUX #U2, and the third up-channel multiplexing group MUX #U3.

For example, at the time of sensing of the first up-channel multiplexing group MUX #U1, the touch driving circuit TDC supplies a touch driving signal to the touch electrodes TE included in the first up-channel multiplexing group MUX #U1 and performs sensing. At this time, a load-free driving signal LFD may be supplied to the touch electrodes TE included in the second up-channel multiplexing group MUX #U2 and the third up-channel multiplexing group MUX #U3. The load-free driving signal LFD may be equal to the touch driving signal in one or more of frequency, phase, and amplitude or may be different therefrom within a preset allowable range.

For example, at the time of sensing of the second up-channel multiplexing group MUX #U2, the touch driving circuit TDC supplies a touch driving signal to the touch electrodes TE included in the second up-channel multiplexing group MUX #U2 and performs sensing. At this time, a load-free driving signal LFD may be supplied to the touch electrodes TE included in the first up-channel multiplexing group MUX #U1 and the third up-channel multiplexing group MUX #U3.

Referring to FIG. 22, when a touch object (a touch operation) is input to one area (the first area or the second area) of the first area Au1 corresponding to an up-channel area and the second area Ad1 corresponding to a down-channel area, a normal touch sensing signal is acquired from the one area (the first area or the second area) and sensing values with a normal position distribution are acquired, and ghost data is generated from the other area (the second area or the first area). The ghost data has a dispersed position distribution and thus can be removed through an algorithm.

FIGS. 23 and 24 are diagrams illustrating a full-sensing method in the touch display device according to embodiments of the present disclosure.

Referring to FIG. 23, in the first touch sensor structure according to the embodiments of the present disclosure, a touch electrode TE disposed in the first area Au1 and a touch electrode TE disposed in the second area Ad1 are connected to each other via one touch line TL. In other words, a touch line TL connected to one touch electrode disposed in the first area Au1 and a touch line TL connected to one touch electrode TE disposed in the second area Ad1 are electrically connected to each other. That is, an up-channel (a touch line) for the first area Au1 and a down-channel (a touch line) for the second area Ad1 are connected to each other.

Referring to FIG. 23, in order to improve touch sensing accuracy, the touch driving circuit TDC can perform full-sensing. That is, the touch driving circuit TDC can first perform driving and sensing in the first area Au1 corresponding to an up-channel area and then perform driving and sensing for the second area Ad1 corresponding to a down-channel area.

Referring to FIG. 23, the touch driving circuit TDC sequentially senses the first down-channel multiplexing group MUX #D1, the second down-channel multiplexing group MUX #D2, and the third down-channel multiplexing group MUX #D3 after sequentially sensing the first up-channel multiplexing group MUX #U1, the second up-channel multiplexing group MUX #U2, and the third up-channel multiplexing group MUX #U3.

For example, at the time of sensing of the first up-channel multiplexing group MUX #U1, the touch driving circuit TDC supplies a touch driving signal to the touch electrodes TE included in the first up-channel multiplexing group MUX #U1 and performs sensing. At this time, a load-free driving signal LFD may be supplied to the touch electrodes TE included in the second up-channel multiplexing group MUX #U2 and the third up-channel multiplexing group MUX #U3. The load-free driving signal LFD may be equal to the touch driving signal in one or more of frequency, phase, and amplitude or may be different therefrom within a preset allowable range.

For example, at the time of sensing of the first down-channel multiplexing group MUX #D1, the touch driving circuit TDC supplies a touch driving signal to the touch electrodes TE included in the first down-channel multiplexing group MUX #D1 and performs sensing. At this time, a load-free driving signal LFD may be supplied to the touch electrodes TE included in the second down-channel multiplexing group MUX #D2 and the third down-channel multiplexing group MUX #D3.

On the other hand, when the touch driving signal is supplied to the touch electrodes TE which are sensed, a data-load-free driving signal LFD is supplied to data lines DL corresponding to or overlapping the touch electrodes TE which are sensed. Alternatively, when the touch driving signal is supplied to the touch electrodes TE which are sensed, the data-load-free driving signal LFD is supplied to other data lines DL as well as the data lines DL corresponding to or overlapping the touch electrodes TE which are sensed. For example, when the touch driving signal is supplied to the touch electrodes TE which are sensed, the data-load-free driving signal LFD may be supplied to all the data lines DL.

Here, the data-load-free driving signal LFD may be equal to the touch driving signal which is supplied to the touch electrodes TE in one or more of frequency, phase, and amplitude or may be different therefrom within a preset allowable range. Accordingly, at the time of touch sensing, it is possible to reduce or prevent parasitic capacitance between the touch electrodes TE which are sensed and the data lines DL and to improve touch sensitivity.

When the touch driving signal is supplied to the touch electrodes TE which are sensed, a gate-load-free driving signal LFD is supplied to gate lines GL corresponding to or overlapping the touch electrodes TE which are sensed. Alternatively, when the touch driving signal is supplied to the touch electrodes TE which are sensed, the gate-load-free driving signal LFD is supplied to other gate lines GL as well as the gate lines GL corresponding to or overlapping the touch electrodes TE which are sensed. For example, when the touch driving signal is supplied to the touch electrodes TE which are sensed, the gate-load-free driving signal LFD may be supplied to all the gate lines GL.

Here, the gate-load-free driving signal LFD may be equal to the touch driving signal which is supplied to the touch electrodes TE in one or more of frequency, phase, and amplitude or may be different therefrom within a preset allowable range. Accordingly, at the time of touch sensing, it is possible to reduce or prevent parasitic capacitance between the touch electrodes TE which are sensed and the gate lines GL and to improve touch sensitivity.

When the touch driving signal is supplied to the touch electrodes TE which are sensed, a load-free driving signal LFD may be supplied to the touch electrodes TE other than the touch electrodes TE which are sensed. For example, when the touch driving signal is supplied to the touch electrodes TE which are sensed, the load-free driving signal LFD may be supplied to all the other touch electrodes TE.

Here, the load-free driving signal LFD may be equal to the touch driving signal supplied to the touch electrodes TE which are sensed in one or more of frequency, phase, and amplitude or may be different therefrom within a preset allowable range. Accordingly, at the time of touch sensing, it is possible to reduce or prevent parasitic capacitance between the touch electrodes TE which are sensed and the other touch electrodes TE and to improve touch sensitivity.

Referring to FIG. 24, when a touch object (a touch operation) is input to one area (the first area or the second area) of the first area Au1 corresponding to an up-channel area and the second area Ad1 corresponding to a down-channel area, a normal touch sensing signal is acquired from the one area (the first area or the second area) and sensing values with a normal position distribution are acquired, and ghost data is generated from the other area (the second area or the first area). The ghost data has a dispersed position distribution and thus can be removed through an algorithm.

FIG. 25 is a diagram illustrating a large touch sensor structure of the touch display device according to embodiments of the present disclosure.

Referring to FIG. 25, for example, a touch sensing area TSA of a large touch panel TSP is divided into a first touch sensing area TSA1 and a second touch sensing area TSA2.

In this large touch panel TSP, a third touch sensor structure is slightly different from the third touch sensor structure illustrated in FIG. 5. That is, in the third touch sensor structure of the large touch panel TSP, a first area Au1 and a second area Ad1 which form a pair in view of the touch electrode connection structure are located adjacent to each other, a third area Au2 and a fourth area Ad2 which form a pair in view of the touch electrode connection structure are located adjacent to each other.

Referring to FIG. 25, the first area Au1 and the second area Ad1 which forma pair in view of the touch electrode connection structure are disposed in a first touch sensing area TSA1. The third area Au2 and the fourth area Ad2 which form a pair in view of the touch electrode connection structure are disposed in a second touch sensing area TSA2.

Referring to FIG. 25, the touch driving circuit TDC includes one or more first touch driving circuits TDC1 which correspond to the first touch sensing area TSA1 and which are electrically connected to the first touch line TL and a second touch line TL and one or more second touch driving circuits TDC2 which correspond to the second touch sensing area TSA2 and which are electrically connected to a third touch line TL and a fourth touch line TL.

According to the above embodiments of the present disclosure, it is possible to provide a touch display device with a touch sensor structure that can decrease the number of touch lines and the number of touch channels in comparison with the number of touch electrodes.

According to the above embodiments of the present disclosure, it is possible to provide a touch display device with a touch sensor structure that can decrease the number of touch lines and the number of touch channels and that is strong to a ghost which is misrecognized as a touch.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
    a plurality of touch electrodes that are arranged in n rows and m columns in a touch sensing area;
    a plurality of touch lines that are electrically connected to the plurality of touch electrodes; and
    a plurality of contact holes including a first contact hole, a second contact hole, a third contact hole, and a fourth contact hole, wherein the touch sensing area is divided into k areas, where k is a natural number equal to or greater than 2, and m is a natural number equal to or greater than 2, wherein each of the k areas includes a plurality of touch electrode rows, wherein the k areas include a first area and a second area, wherein the first area includes a first touch electrode and a second touch electrode which are arranged in a same touch electrode row, and the second area includes a third touch electrode and a fourth touch electrode which are arranged in different touch electrode rows, wherein the plurality of touch lines include a first touch line which is electrically connected to the first touch electrode and the third touch electrode, and a second touch line which is electrically connected to the second touch electrode and the fourth touch electrode, wherein, in the first area, the first touch electrode is disposed in a first touch electrode column and the second touch electrode is disposed in a second touch electrode column subsequent to the first touch electrode column, wherein, in the second area, the third touch electrode is disposed in the first touch electrode column, wherein, in the second area, the fourth touch electrode is disposed in the second touch electrode column, wherein, in the second area, the third touch electrode is disposed in an i-th touch electrode row out of the plurality of touch electrode rows included in the second area, wherein, in the second area, the fourth touch electrode is disposed in one of plurality of touch electrode rows other than an (i−1)-th touch electrode row, the i-th touch electrode row, and an (i+1)-th touch electrode row out of the plurality of touch electrode rows included in the second area, wherein the first touch line is electrically connected to the first touch electrode via the first contact hole in the first area, and is electrically connected to the third touch electrode via the third contact hole in the second area, wherein the second touch line is electrically connected to the second touch electrode via the second contact hole in the first area, and is electrically connected to the fourth touch electrode via the fourth contact hole in the second area, wherein the first touch electrode and the second touch electrode are directly adjacent to each other without another touch electrode being located between the first touch electrode and the second touch electrode, and wherein at least one touch electrode is located between the third touch electrode and the fourth touch electrode.

2. The touch display device according to claim 1, wherein a number of the plurality of touch lines is (m×n)/Nc, where Nc is a number of touch electrodes connected to one touch line.

3. The touch display device according to claim 1, wherein a separation distance between the third touch electrode and the fourth touch electrode is greater than a length in a column direction of the third touch electrode or the fourth touch electrode.

4. The touch display device according to claim 1, wherein the first touch line is located between the first touch electrode and the third touch electrode and overlaps touch electrodes from the plurality of touch electrodes that are disposed in one or more of the first area and the second area.

5. The touch display device according to claim 1, wherein the first area and the second area are adjacent to each other.

6. The touch display device according to claim 1, wherein the k areas further include a third area which is located between the first area and the second area, wherein the third area includes a fifth touch electrode and a sixth touch electrode which are disposed in different touch electrode rows, wherein the first touch line is electrically connected to the first touch electrode, the third touch electrode, and the fifth touch electrode and the second touch line is electrically connected to the second touch electrode, the fourth touch electrode, and the sixth touch electrode, and wherein, in the third area, the fifth touch electrode is disposed in the first touch electrode column, the sixth touch electrode is disposed in the second touch electrode column, the fifth touch electrode is disposed in a j-th touch electrode row out of the plurality of touch electrode rows included in the third area, and the sixth touch electrode is disposed in one of the plurality of touch electrode rows other than a (j−1)-th touch electrode row, the j-th touch electrode row, and a (j+1)-th touch electrode row out of the plurality of touch electrode rows included in the third area.

7. The touch display device according to claim 1, wherein the k areas further include a third area and a fourth area, wherein the third area includes a fifth touch electrode and a sixth touch electrode which are disposed in a same touch electrode row, and the fourth area includes a seventh touch electrode and an eighth touch electrode which are disposed in different touch electrode rows, wherein the plurality of touch lines further include a third touch line which is electrically connected to the fifth touch electrode and the sixth touch electrode, and a fourth touch line which is electrically connected to the seventh touch electrode and the eighth touch electrode, wherein, in the third area, the fifth touch electrode is disposed in the first touch electrode column and the sixth touch electrode is disposed in the second touch electrode column, and wherein, in the fourth area, the seventh touch electrode is disposed in the first touch electrode column, the eighth touch electrode is disposed in the second touch electrode column, the seventh touch electrode is disposed in a j-th touch electrode row out of the plurality of touch electrode rows included in the fourth area, and the eighth touch electrode is disposed in one of the plurality of touch electrode rows other than a (j−1)-th touch electrode row, the j-th touch electrode row, and a (j+1)-th touch electrode row out of the plurality of touch electrode rows included in the fourth area.

8. The touch display device according to claim 7, wherein the third area is located between the first area and the second area, and the second area is located between the third area and the fourth area.

9. The touch display device according to claim 7, wherein the touch sensing area is divided into a first touch sensing area and a second touch sensing area, the first area and the second area are disposed in the first touch sensing area, and the third area and the fourth area are disposed in the second touch sensing area.

10. The touch display device according to claim 9, further comprising:

a first touch driving circuit that is electrically connected to the first touch line and the second touch line; and a second touch driving circuit that is electrically connected to the third touch line and the fourth touch line.

11. The touch display device according to claim 7, wherein positions of touch electrodes from the plurality of touch electrodes in the second area that are electrically connected to touch electrodes from the plurality of touch electrodes disposed in the first touch electrode row out of the plurality of touch electrode rows included in the first area have a periodic zigzag pattern.

12. The touch display device according to claim 11, wherein a pattern of positions of the touch electrodes in the second area which are electrically connected to the touch electrodes disposed in the first touch electrode row included in the first area is same as a pattern of positions of the touch electrodes in the second area which are electrically connected to the touch electrodes disposed in a second touch electrode row different from the first touch electrode row included in the first area.

13. The touch display device according to claim 11, wherein a pattern of positions of the touch electrodes in the second area which are electrically connected to the touch electrodes disposed in the first touch electrode row included in the first area is different from a pattern of positions of the touch electrodes in the second area which are electrically connected to the touch electrodes disposed in a second touch electrode row different from the first touch electrode row included in the first area.

14. The touch display device according to claim 1, further comprising a touch driving circuit configured to acquire a sensing value via the first touch line which is electrically connected to the first touch electrode and the third touch electrode, to acquire a sensing value via the second touch line which is electrically connected to the second touch electrode and the fourth touch electrode, and to output sensing data including the acquired sensing values,
wherein, when a touch has occurred in the first area out of the first area and the second area of the touch sensing area, positions of touch electrodes from the plurality of touch electrodes in which a sensing value is equal to or greater than a threshold value in the first area are gathered, and positions of touch electrodes from the plurality of touch electrodes in which a sensing value is equal to or greater than the threshold value in the second area are dispersed.

15. The touch display device according to claim 14, further comprising a touch controller configured to determine touch coordinates using the sensing data,
wherein the touch controller is configured to remove the sensing values, which are equal to or greater than the threshold value, of the touch electrodes from the plurality of touch electrodes which are dispersed in positions in the second area as ghost data and determines touch coordinates based on the sensing values, which are equal to or greater than the threshold value, of the touch electrodes from the plurality of touch electrodes which are gathered in positions in the first area.

16. The touch display device according to claim 14, wherein the touch driving circuit includes:
an up-channel multiplexer circuit configured to sequentially drive and sense two or more multiplexing groups which are groups of the touch electrodes disposed in the first area;
a down-channel multiplexer circuit configured to sequentially drive and sense two or more multiplexing groups which are groups of the touch electrodes disposed in the second area; and
a selection switch circuit configured to select one of the up-channel multiplexer circuit and the down-channel multiplexer circuit, and wherein the selection switch circuit is configured to select the up-channel multiplexer circuit at a time of sensing the first area out of the first area and the second area and to select the down-channel multiplexer circuit at a time of sensing the second area out of the first area and the second area.

17. The touch display device according to claim 1, further comprising a touch sensing circuit is configured to sense the touch lines connected to touch electrodes from the plurality of touch electrodes in the first area and the second area and to determine a touch or touch coordinates in the first area and the second area.

18. A touch display device comprising:
a plurality of touch electrodes including a first touch electrode, a second touch electrode, a third touch electrode, a fourth touch electrode, a fifth touch electrode, a sixth touch electrode, a seventh touch electrode, and an eighth touch electrode in a touch sensing area of the touch display device;
a plurality of touch lines including a first touch line, a second touch line, a third touch line, and a fourth touch line in the touch sensing area; and
a plurality of contact holes including a first contact hole, a second contact hole, a third contact hole, a fourth contact hole, a fifth contact hole, a sixth contact hole, a seventh contact hole, and an eighth contact hole,
wherein the first touch line is electrically connected to the first touch electrode via the first contact hole and the fifth touch electrode via the fifth contact hole,
wherein the second touch line is electrically connected to the third touch electrode via the third contact hole and the seventh touch electrode via the seventh contact hole,
wherein the third touch line is electrically connected to the second touch electrode via the second contact hole and the sixth touch electrode via the sixth contact hole,
wherein the fourth touch line is electrically connected to the fourth touch electrode via the fourth contact hole and the eighth touch electrode via the eighth contact hole,
wherein the first touch line overlaps the third touch electrode, and the second touch line overlaps the fifth touch electrode without overlapping the second touch electrode, the fourth touch electrode, the sixth touch electrode, and the eighth touch electrode,
wherein the third touch line overlaps the fourth touch electrode, and the fourth touch line overlaps the eighth touch electrode without overlapping the first touch electrode, the third touch electrode, the fifth touch electrode, and the seventh touch electrode,
wherein a first distance between the first touch electrode and the third touch electrode is different from a second distance between the fifth electrode and the seventh touch electrode, and
wherein a third distance between the second electrode and the fourth touch electrode is different from a fourth distance between the sixth electrode and the eighth touch electrode.

19. The touch display device according to claim 18, wherein the first distance is the same as the third distance.

20. The touch display device according to claim 19, wherein the second distance is the same as the fourth distance.

21. The touch display device according to claim 18, wherein the first touch electrode and the third touch electrode are directly adjacent to each other without another touch electrode being located between the first touch electrode and the third touch electrode, and
  wherein a ninth touch electrode is located between the fifth touch electrode and the seventh touch electrode.

22. The touch display device according to claim 21, wherein the second touch electrode and the fourth touch electrode are directly adjacent to each other without another touch electrode being located between the second touch electrode and the fourth touch electrode, and
  wherein a tenth touch electrode is located between the sixth touch electrode and the eighth touch electrode.

\* \* \* \* \*